(12) United States Patent
Smith

(10) Patent No.: US 11,874,507 B2
(45) Date of Patent: Jan. 16, 2024

(54) DUST CAP FOR FIBER OPTIC ADAPTERS

(71) Applicant: Jack William Smith, East Gull Lake, MN (US)

(72) Inventor: Jack William Smith, East Gull Lake, MN (US)

( * ) Notice: Subject to any disclaimer, the term of this patent is extended or adjusted under 35 U.S.C. 154(b) by 43 days.

(21) Appl. No.: 16/767,701

(22) PCT Filed: Nov. 26, 2018

(86) PCT No.: PCT/US2018/062458
§ 371 (c)(1),
(2) Date: May 28, 2020

(87) PCT Pub. No.: WO2019/104273
PCT Pub. Date: May 31, 2019

(65) Prior Publication Data
US 2021/0373250 A1 Dec. 2, 2021

Related U.S. Application Data

(60) Provisional application No. 62/590,546, filed on Nov. 25, 2017.

(51) Int. Cl.
*G02B 6/38* (2006.01)
(52) U.S. Cl.
CPC ......... *G02B 6/3849* (2013.01); *G02B 6/3825* (2013.01); *G02B 6/3895* (2013.01)
(58) Field of Classification Search
CPC ... G02B 6/3849; G02B 6/3825; G02B 6/3895
See application file for complete search history.

(56) References Cited

U.S. PATENT DOCUMENTS

| | | | | |
|---|---|---|---|---|
| 6,227,717 B1* | 5/2001 | Ott | ......................... | G02B 6/3849 385/139 |
| 6,547,450 B2* | 4/2003 | Lampert | ............... | G02B 6/3849 385/139 |
| 7,572,066 B2* | 8/2009 | de Jong | ............... | G02B 6/3849 385/39 |
| 7,945,139 B2* | 5/2011 | Parkman, III | ........ | G02B 6/3849 385/139 |
| 9,291,780 B2* | 3/2016 | Lu | ......................... | G02B 6/3849 |
| D772,170 S * | 11/2016 | Watanabe | ..................... | D13/156 |
| 9,823,425 B2* | 11/2017 | Xiao | ..................... | G02B 6/3826 |
| 9,977,193 B2* | 5/2018 | Abe | ..................... | G02B 6/3823 |
| 10,054,747 B2* | 8/2018 | Lee | ..................... | G02B 6/3821 |

(Continued)

FOREIGN PATENT DOCUMENTS

JP 4128508 B2 * 7/2008
WO WO-2014004157 A1 * 1/2014 ........... G02B 6/3849

*Primary Examiner* — Michelle R Connelly
(74) *Attorney, Agent, or Firm* — Antonio Papageorgiou, Esq; Lombard Geliebter LLP

(57) ABSTRACT

A dust cap adapted to fit within a fiber optic adapter. The dust cap includes a dust cap body having a back adapter end and a front knob end. The dust cap body is shaped such that the back adapter end has a press fit with a fiber optic adapter. An opening accommodates an adapter ferrule and a flange is secured in an adapter by a stabilizer and projection. The dust cap also transmits laser light along a longitudinal axis of the solid mass of the dust cap body from just beyond the back adapter end to just beyond the front knob end.

18 Claims, 40 Drawing Sheets

(56) References Cited

U.S. PATENT DOCUMENTS

| | | | | |
|---|---|---|---|---|
| 10,133,010 B2* | 11/2018 | Collier | ................ | G02B 6/3849 |
| 2003/0123812 A1* | 7/2003 | Beatty | ................ | G02B 6/3849 |
| | | | | 385/72 |
| 2018/0196201 A1* | 7/2018 | Chai | ................ | G02B 6/3825 |

* cited by examiner

DUST CAP FOR FIBER OPTIC ADAPTERS

RELATED APPLICATION

This application claims the benefit of U.S. (Provisional) Application No. 62/590,546, which is incorporated herein by reference.

BACKGROUND OF THE INVENTION

The present invention relates generally to dust caps used in fiber optic adapters and more particularly to dust caps for fiber optic port identification.

Fiber optic applications using optical fiber connectors and adapters often require the identification of specific optical fibers during installation, interconnection and maintenance testing. The typical fiber run for a user utilizing a fiber optic connection might extend from a source or central office to a cross box, from the cross box to a curbside access terminal, and finally from the curbside access terminal into the user's home or office. Within such a system, connections of the optical fibers between the various go-betweens are typically maintained through the use of optic fiber adapters mounted within patch panels, cabinets, or racks.

Each of the panels, cabinets, or racks typically includes a large number of fiber optic adapters or ports aligned along a densely packed interface in which fiber connectors can be coupled. Because of the sheer number of cables and the small area in which the cables are packed, as well as the distances and interconnections required of fiber optic applications, the problem of uniquely identifying specific connectors becomes apparent.

When a specific connector of a panel is needed for interconnection with another adaptor, visible light from a visual fault locator VFL is used to perform optical fiber tracing for adaptor identification. A technician working in the user's home, attempting to diagnose a cabling or connection problem, can apply the VFL to the terminus of the fiber optic connector. The VFL emits a bright beam of laser light into the fiber via the terminus to send light throughout the length of cable and any subsequently connected cable. Another technician located at the source or central office can then see a visual indication via visible light on a particular port at the central office to thereby discover the corresponding source port.

Dust caps are used to prevent the optical fiber adapters and connectors used in fiber optic applications from being contaminated by dirt, dust, and other particles, as well as to prevent contact with objects that can scratch, chip, crack, or otherwise physically damage the polished core of the fiber.

Dust caps are traditionally made of opaque plastic materials, such as, low-density polyethylene or rubber like materials. Because of the opaqueness of the cover and complete coverage over the ferrule of the adapter, it is impossible to detect the light from a VFL without removing the dust cap. As a result, for panels having a large number of ports, the technician attempting to identify a particular cable and associated port must remove many dust caps in order to find the visible VFL light.

Removing many dust caps is tedious. Removing dust caps can also be hazardous. The opportunity for eye damage exists if light is directly viewed through the fiber. Removing dust caps can create an opportunity for dust and other contaminants to reach the polished end of the fiber.

To alleviate some of these problems some dust caps having clear or white translucent bodies have been devised. For the most part, such dust caps generally have a dull glow, which can often be very difficult to identify in brightly lit environments. Also, dust caps having clear or white translucent bodies often time are subject to light bleed and reflect light from random sources inside the fiber optic system or from outside sources. Often times the dust cap fit is loose, sometimes falls out and not universally adaptable to the multitude of adapters used in today's systems. This lax fit also allowing contamination of the optic fiber to occur.

Thus, there remains a need for a dust and port identification cap for fiber optic adapters that uses primary and tertiary spectral color and provides for the safe, effective identification of individual fiber optic fibers via a vibrant, yet harmless, visual indication, having an exemplary fit with adapters, without the needless removal of the dust cap.

SUMMARY OF THE INVENTION

A dust and port identification cap for fiber optic adapters is provided that includes an opaque or translucent elongate body having a first end and a second end opposite the first end; the elongate body comprising a flange disposed between the first and second ends of the body; a knob portion at the first end extending outward from the flange; and an adaptor portion at the second end extending outward from the flange in a direction opposite the knob portion.

In one embodiment, the elongate body is made of a material having a red color.

In one embodiment, the elongate body is made of a material having an orange color.

In one embodiment, the elongate body is made of a material having a yellow color.

In one embodiment, the elongate body is made of a material having a green color.

In one embodiment, the elongate body is made of a material having a blue color.

In one embodiment, the elongate body is made of a material having a violet color.

In one embodiment, the elongate body has a cylindrical opening therein extending into the adaptor portion for receiving a fiber optic cable.

Additional aspects of the present invention will be apparent in view of the description which follows.

BRIEF DESCRIPTION OF THE FIGURES

The invention may be more completely understood in consideration of the following detailed description of various embodiments of the invention in connection with the accompanying drawings, in which.

Figure 1:
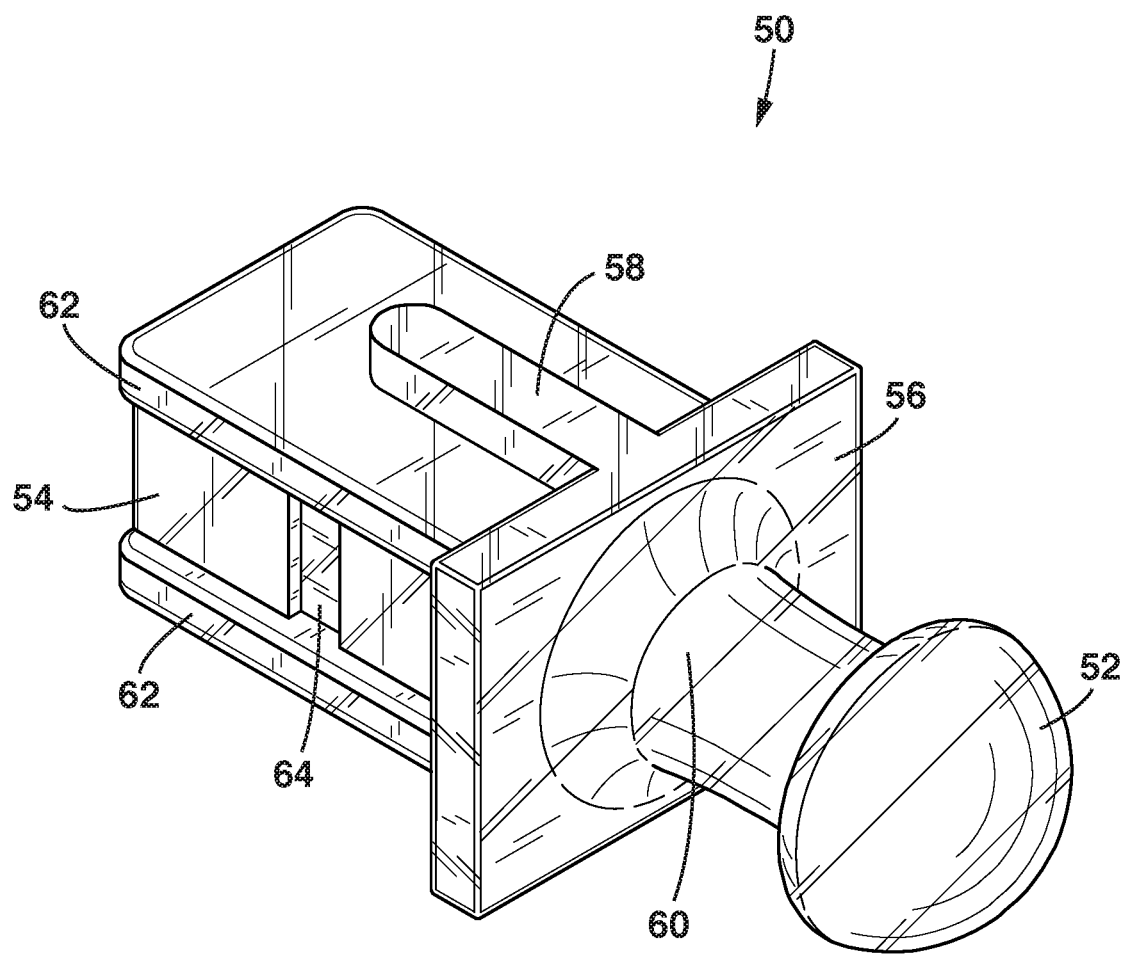
FIG. 1 is a perspective view of one side and the front of the dust and port identification cap for fiber optic adapters according to one embodiment.

While the invention is amenable to various modifications and alternative forms, specifics thereof have been shown by way of example in the drawings and will be described in detail. It should be understood, however, that the intention is not to limit the invention to the particular embodiments described but rather to include all modifications, equivalents, and alternatives.

DETAILED DESCRIPTION OF THE INVENTION

A. Overview

Figure 2:
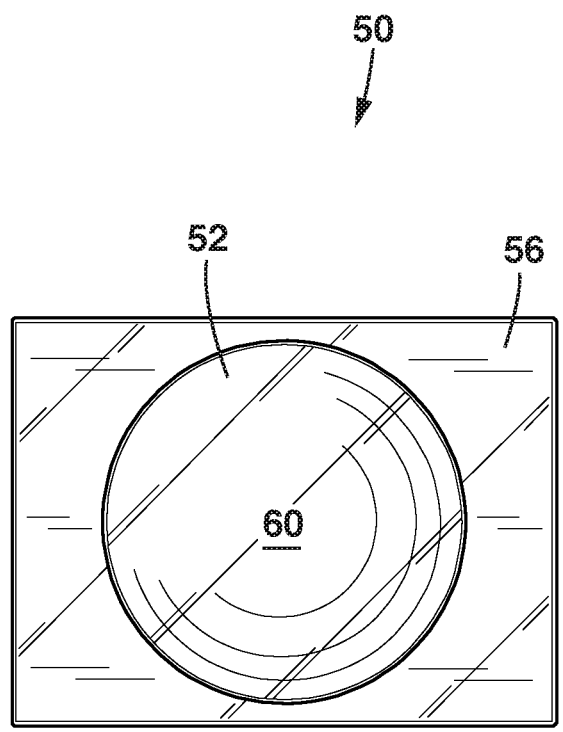
FIG. 2 is a front elevation view thereof.
Figure 3:
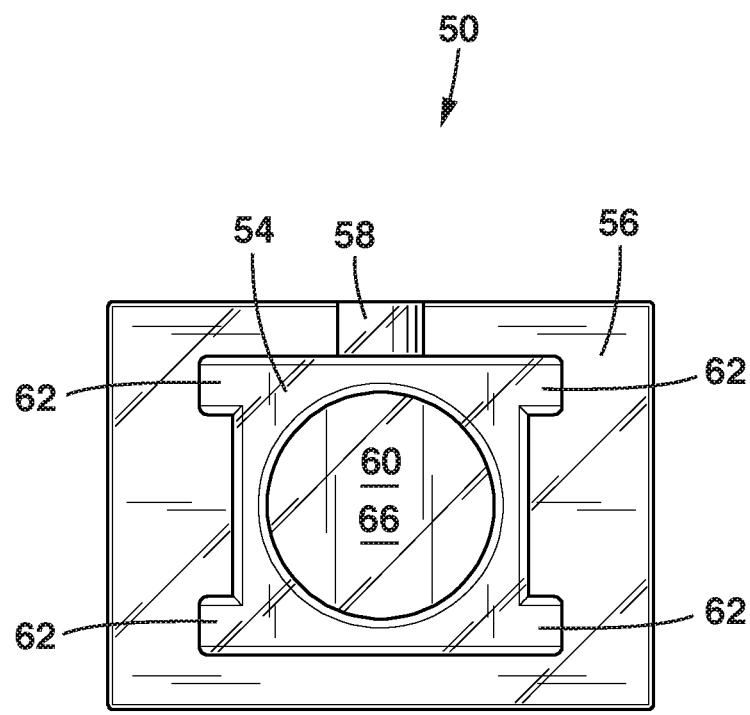
FIG. 3 is a back elevation view thereof.
Figure 4:
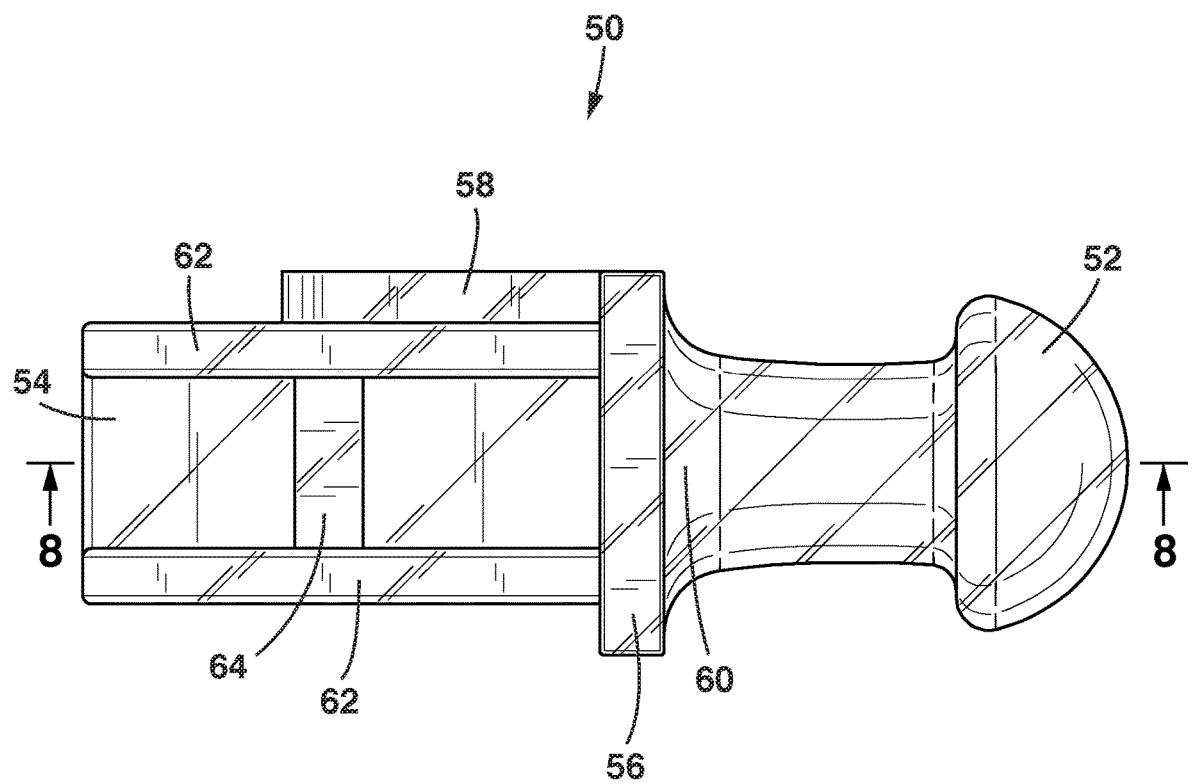
FIG. 4 is a left side elevation view thereof.
Figure 5:
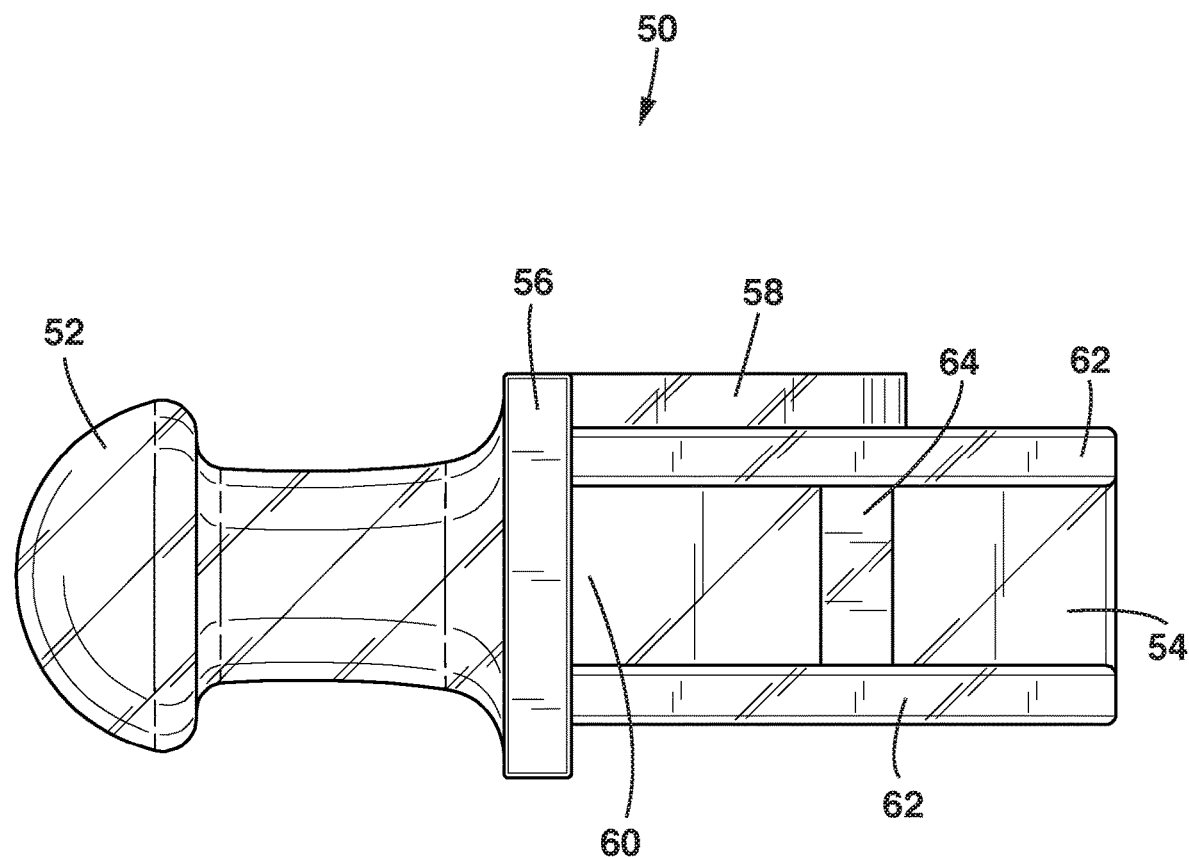
FIG. 5 is a right side elevation view thereof.
Figure 6:
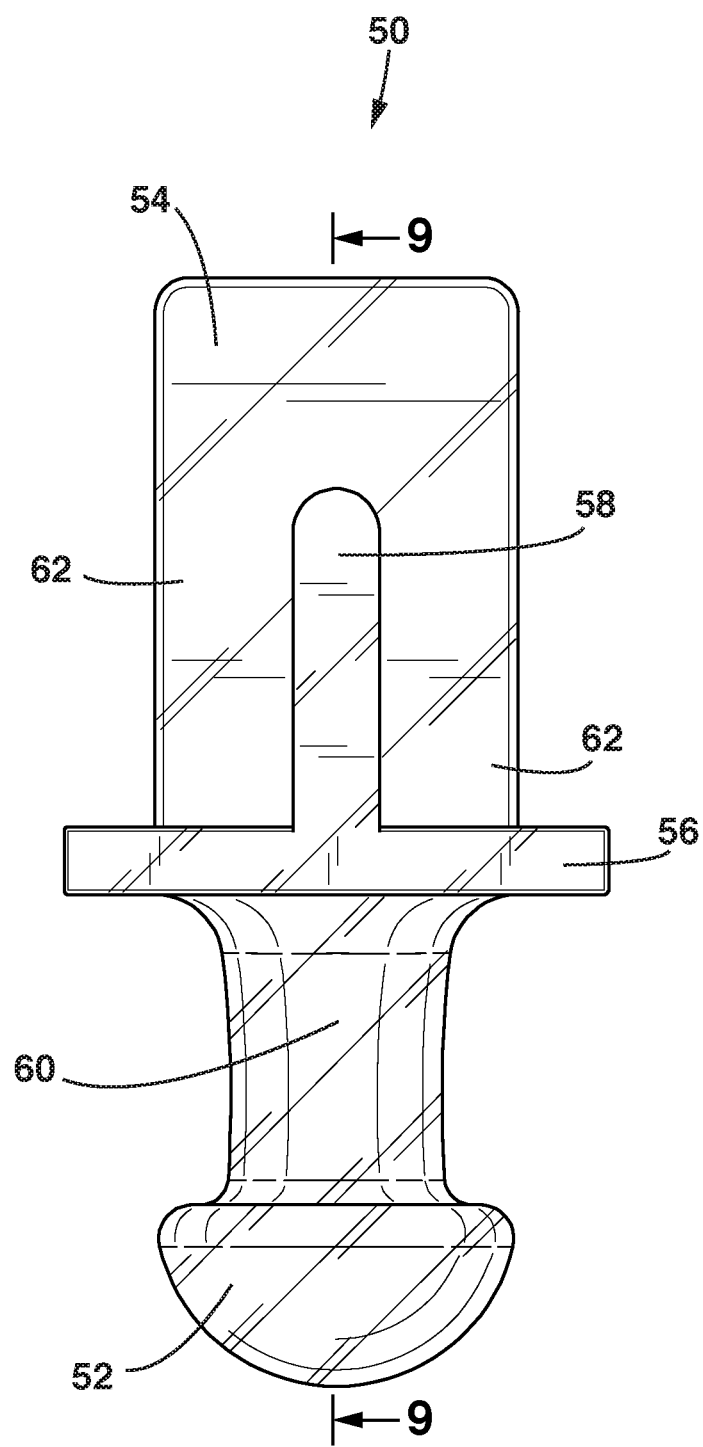
FIG. 6 is a top plan view thereof.
Figure 7:
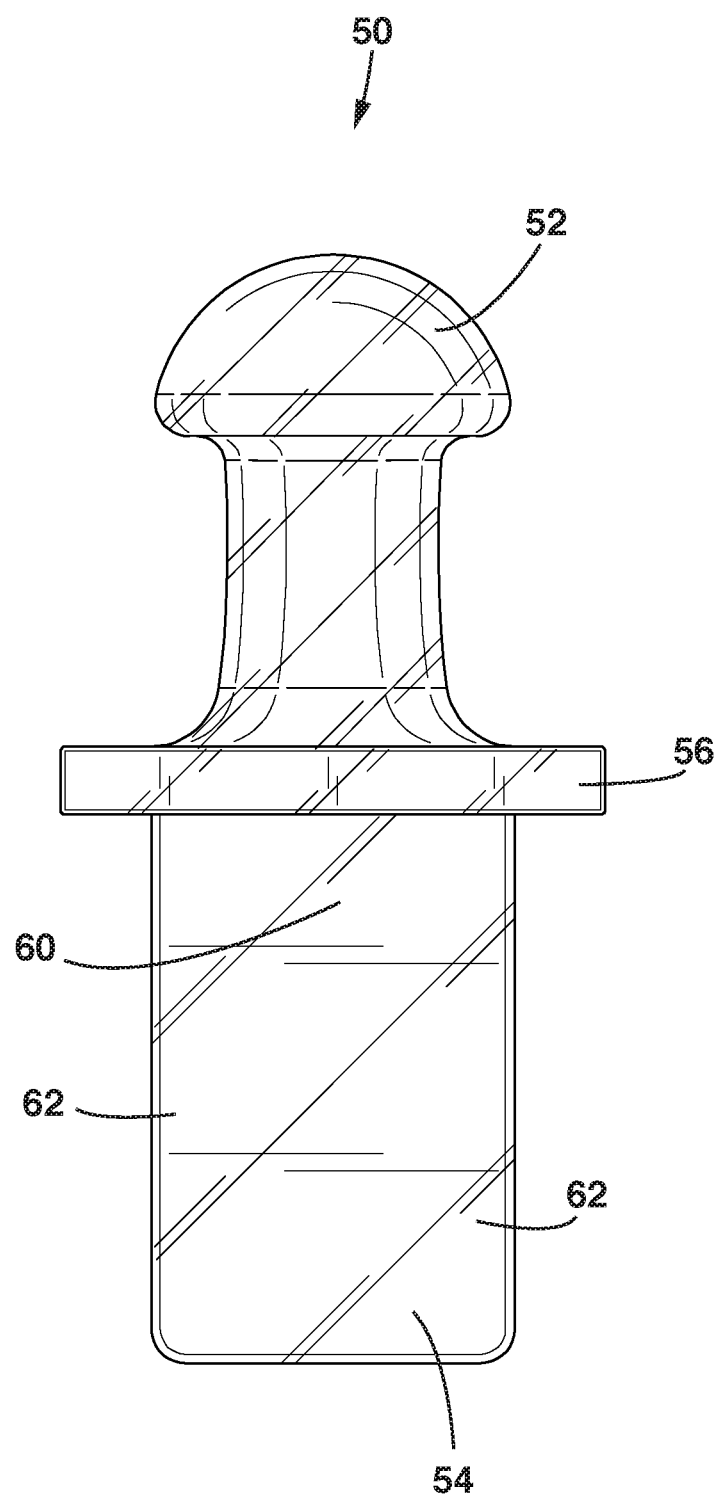
FIG. 7 is a bottom plan view thereof.
Figure 8:
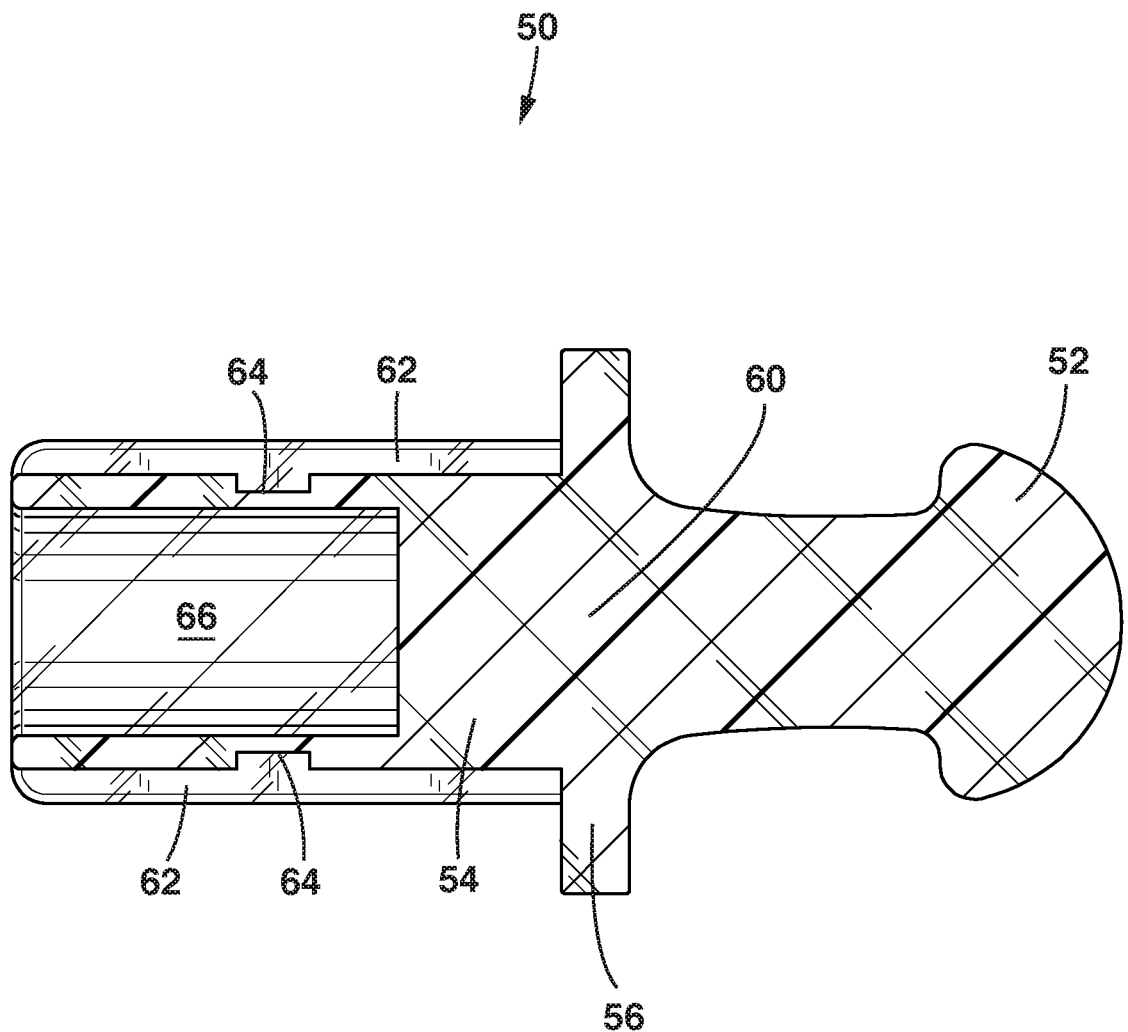
FIG. 8 is a center section view taken from FIG. 4 thereof.
Figure 9:
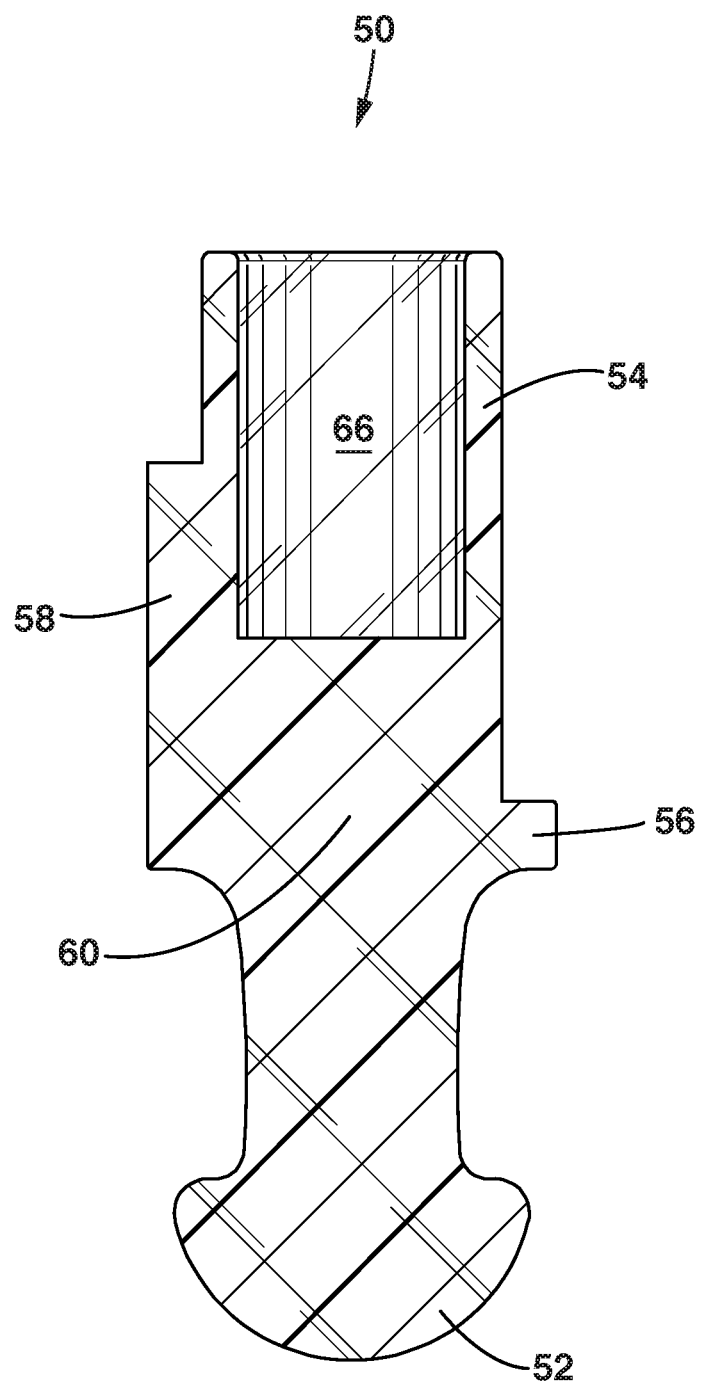
FIG. 9 is a center section view taken from FIG. 6 thereof.
Figure 10:
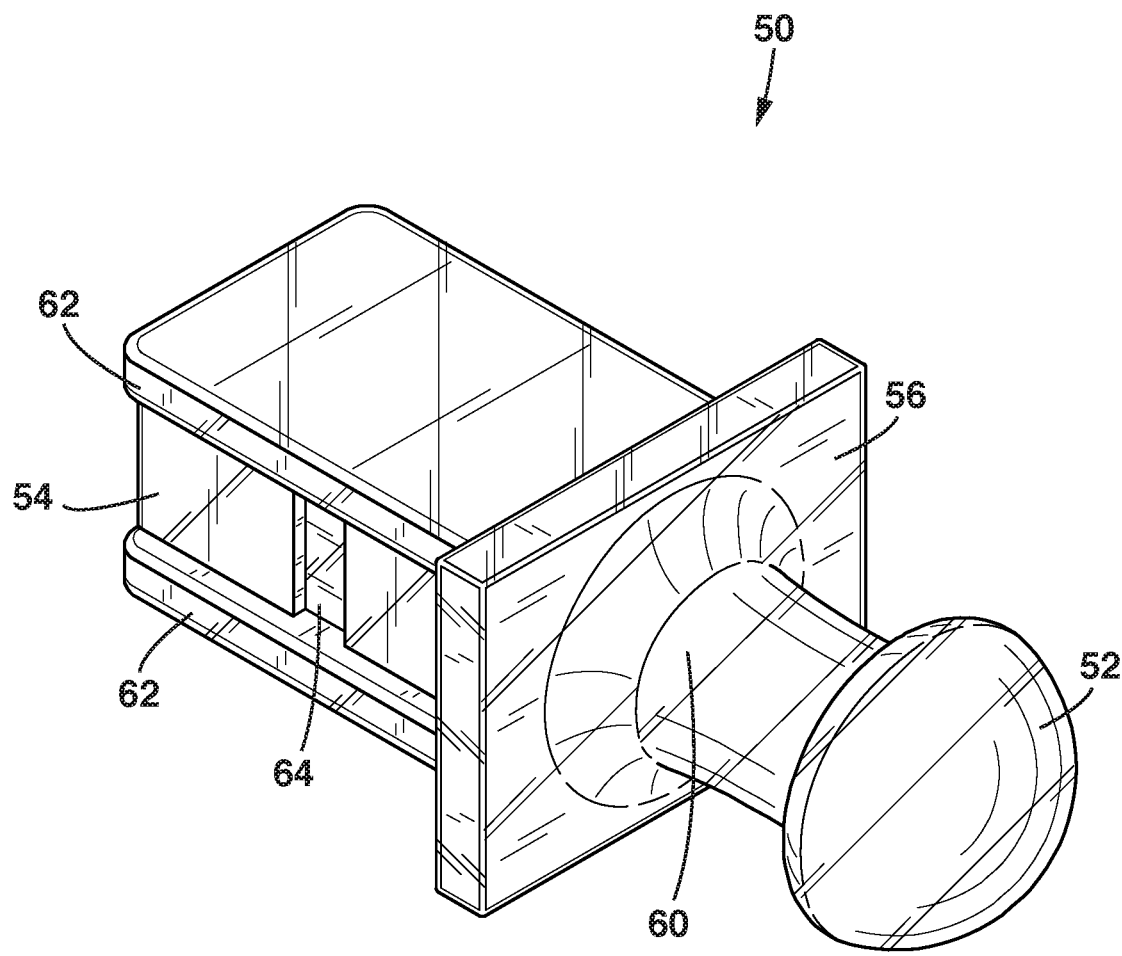
FIG. 10 is a perspective view of one side and the front of the invention according to a second embodiment.
Figure 11:
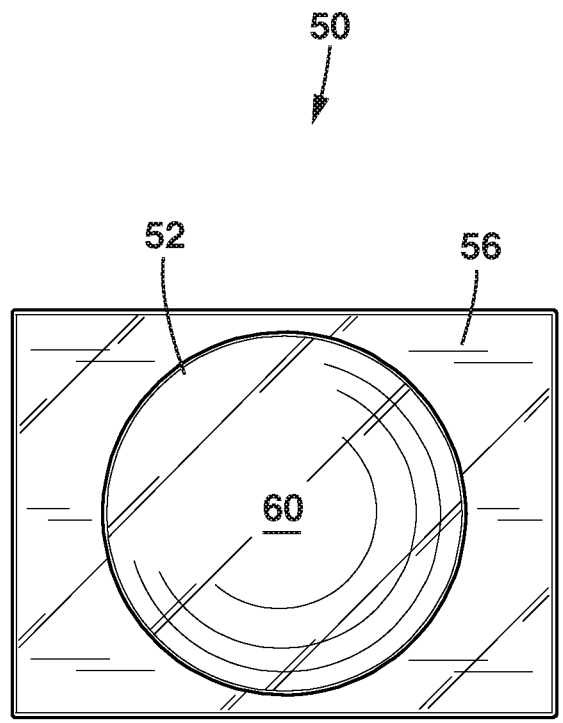
FIG. 11 is a front elevation view thereof.
Figure 12:
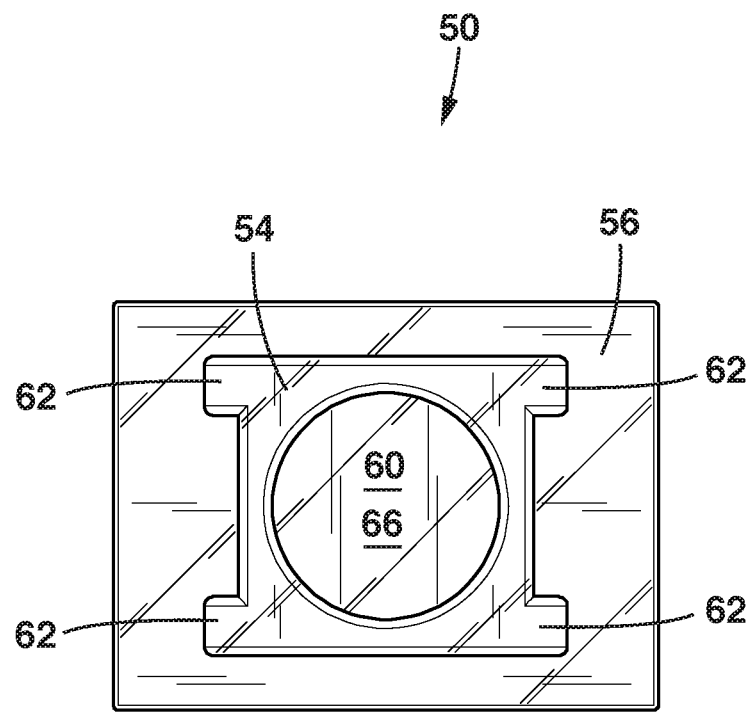
FIG. 12 is a back elevation view thereof.
Figure 13:
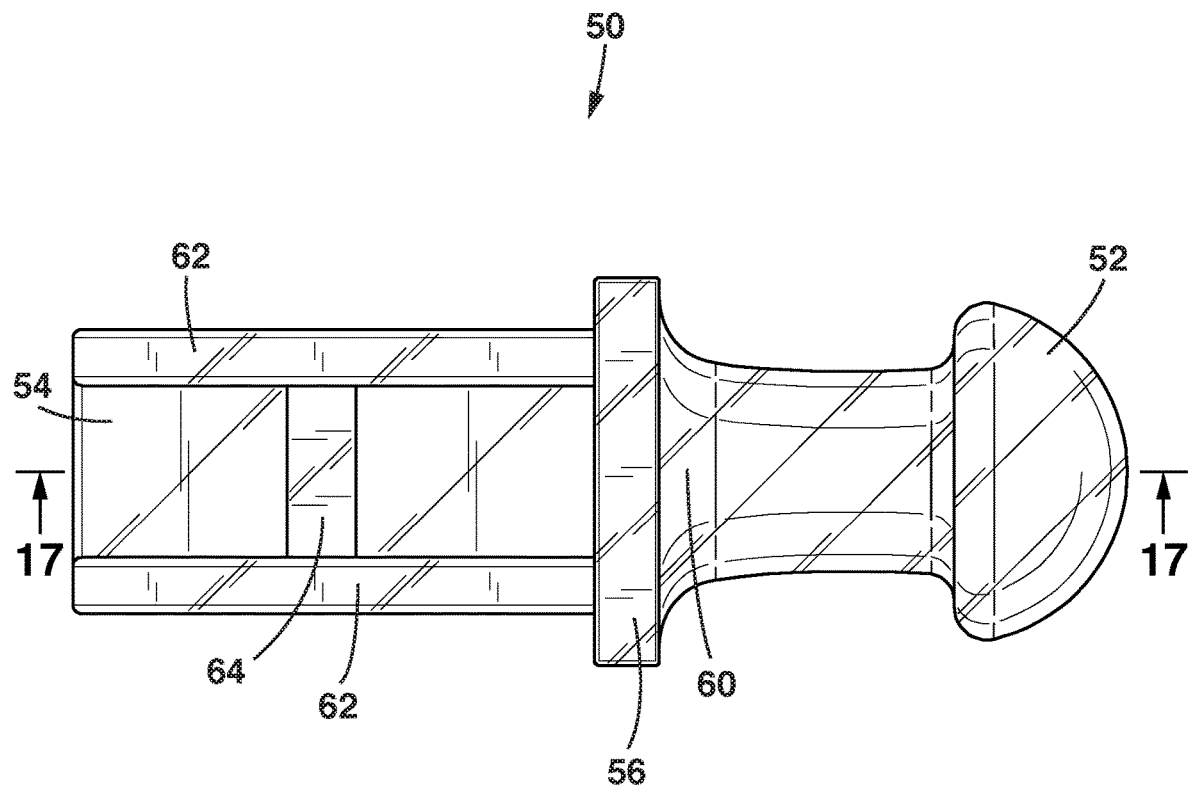
FIG. 13 is a left side elevation view thereof.
Figure 14:
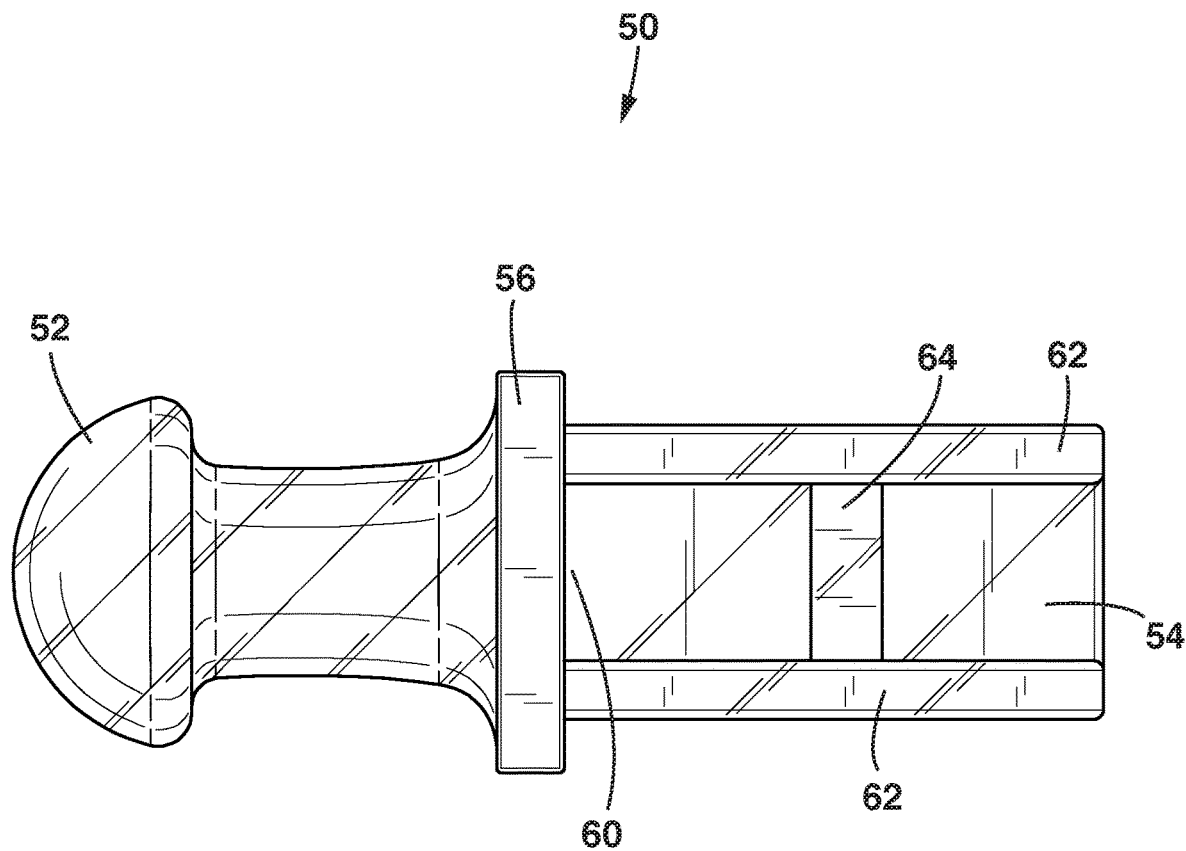
FIG. 14 is a right side elevation view thereof.
Figure 15:
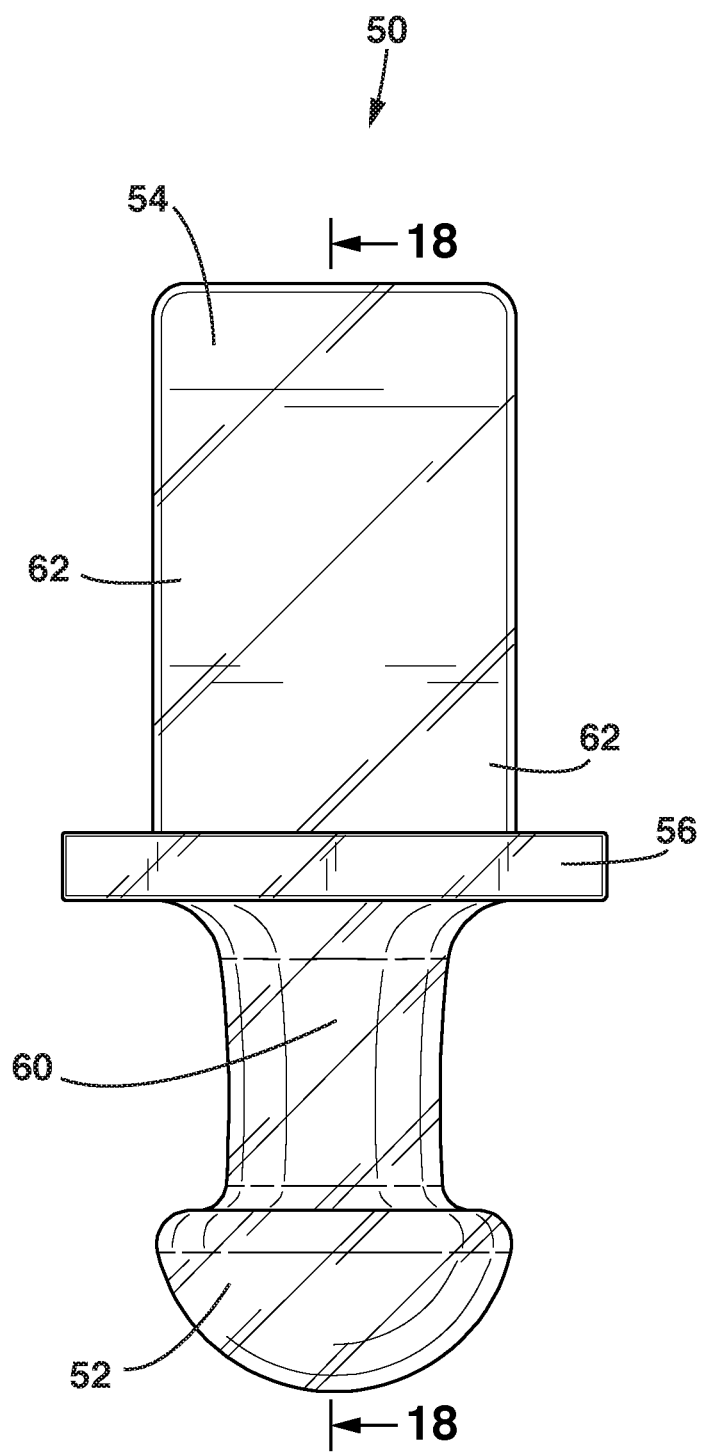
FIG. 15 is a top plan view thereof.
Figure 16:
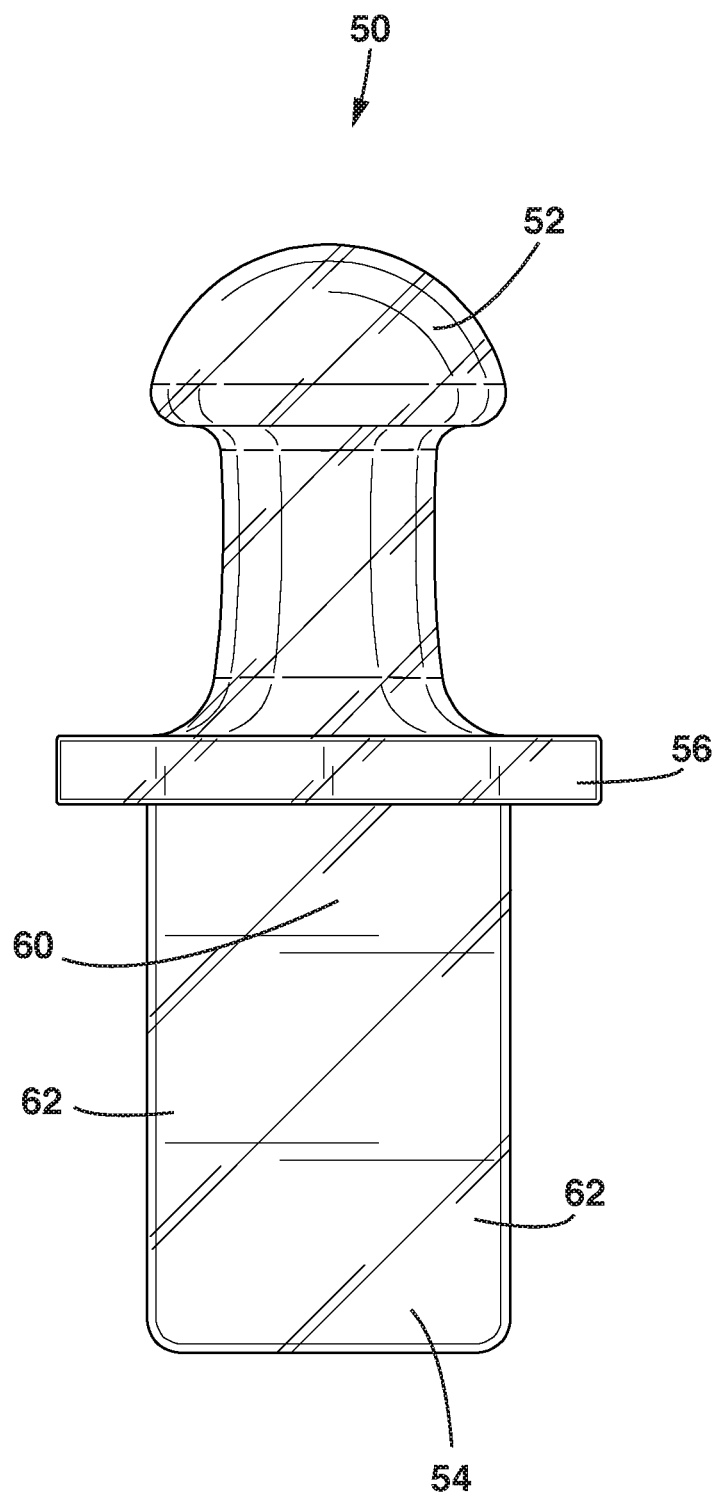
FIG. 16 is a bottom plan view thereof.
Figure 17:
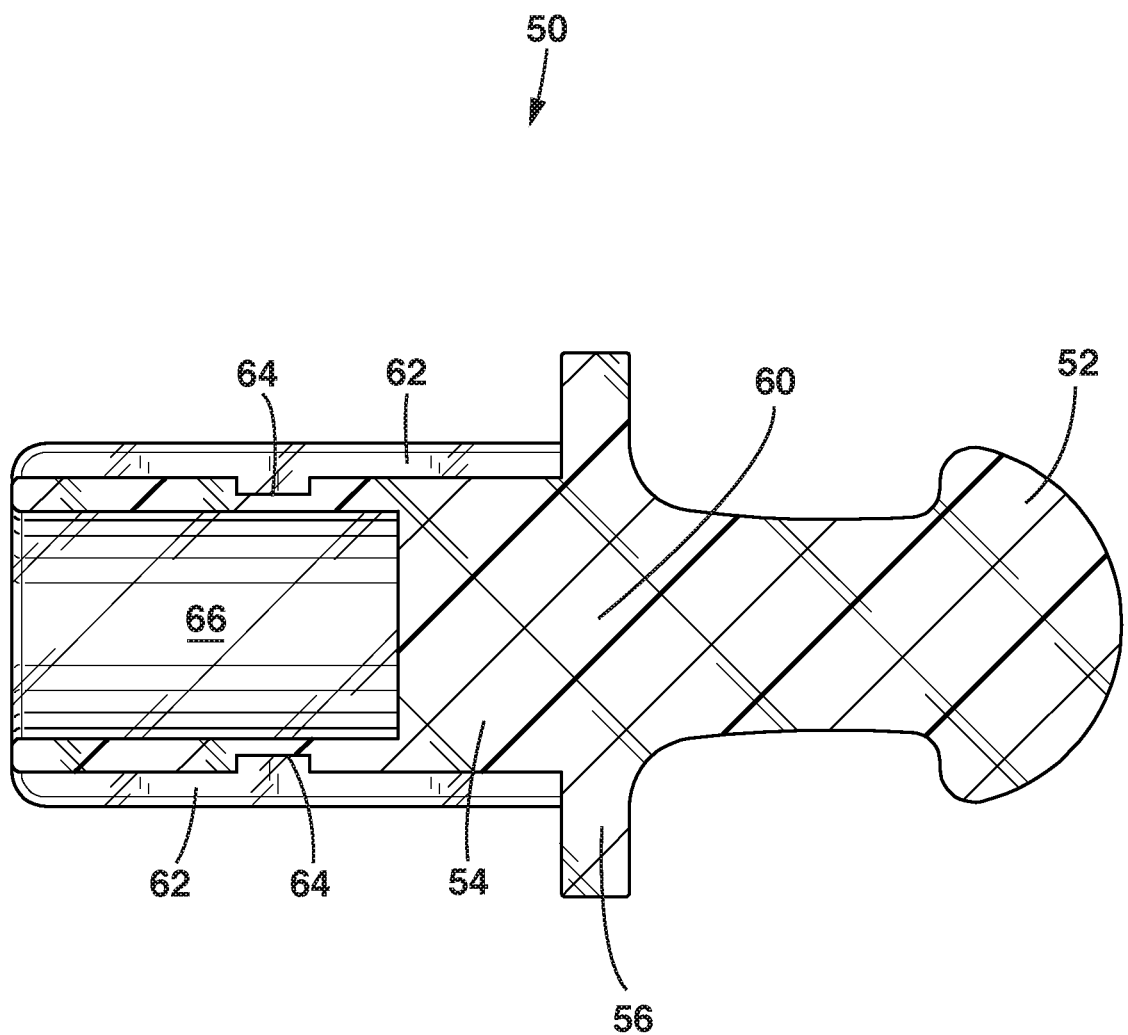
FIG. 17 is a center section view taken from FIG. 13 thereof.
Figure 18:
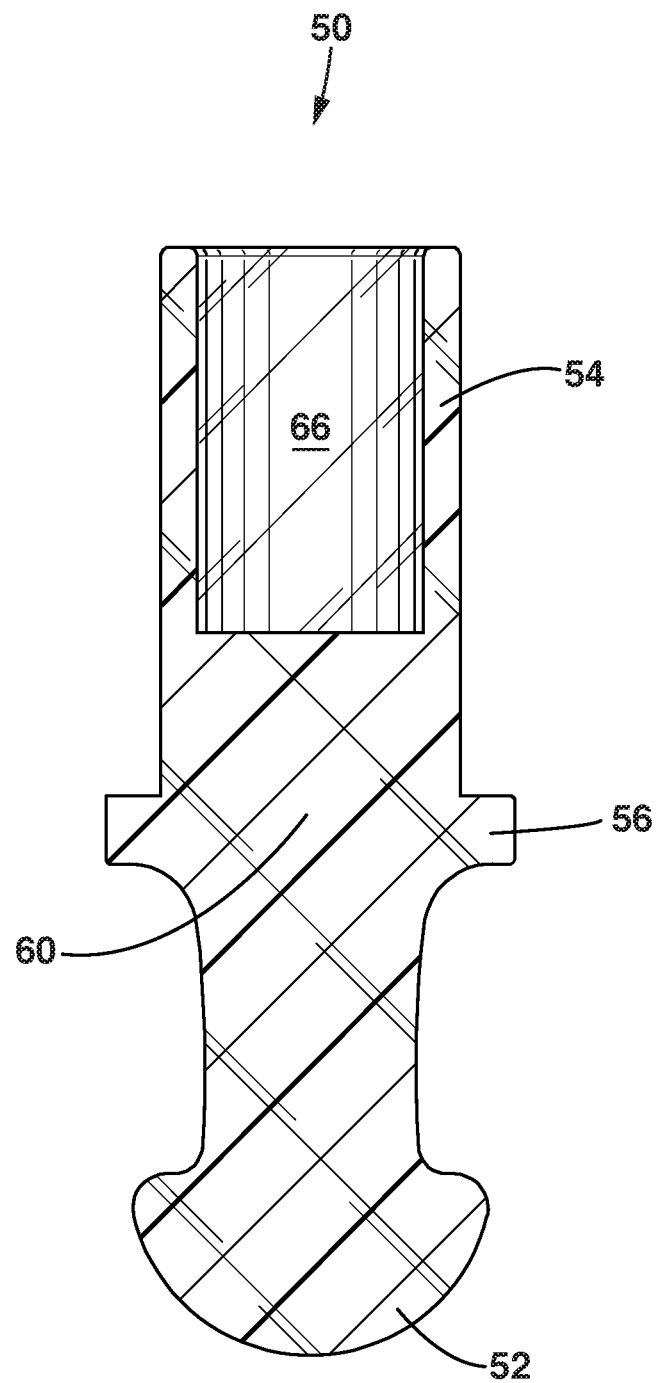
FIG. 18 is a center section view taken from FIG. 15 thereof.
Figure 19:
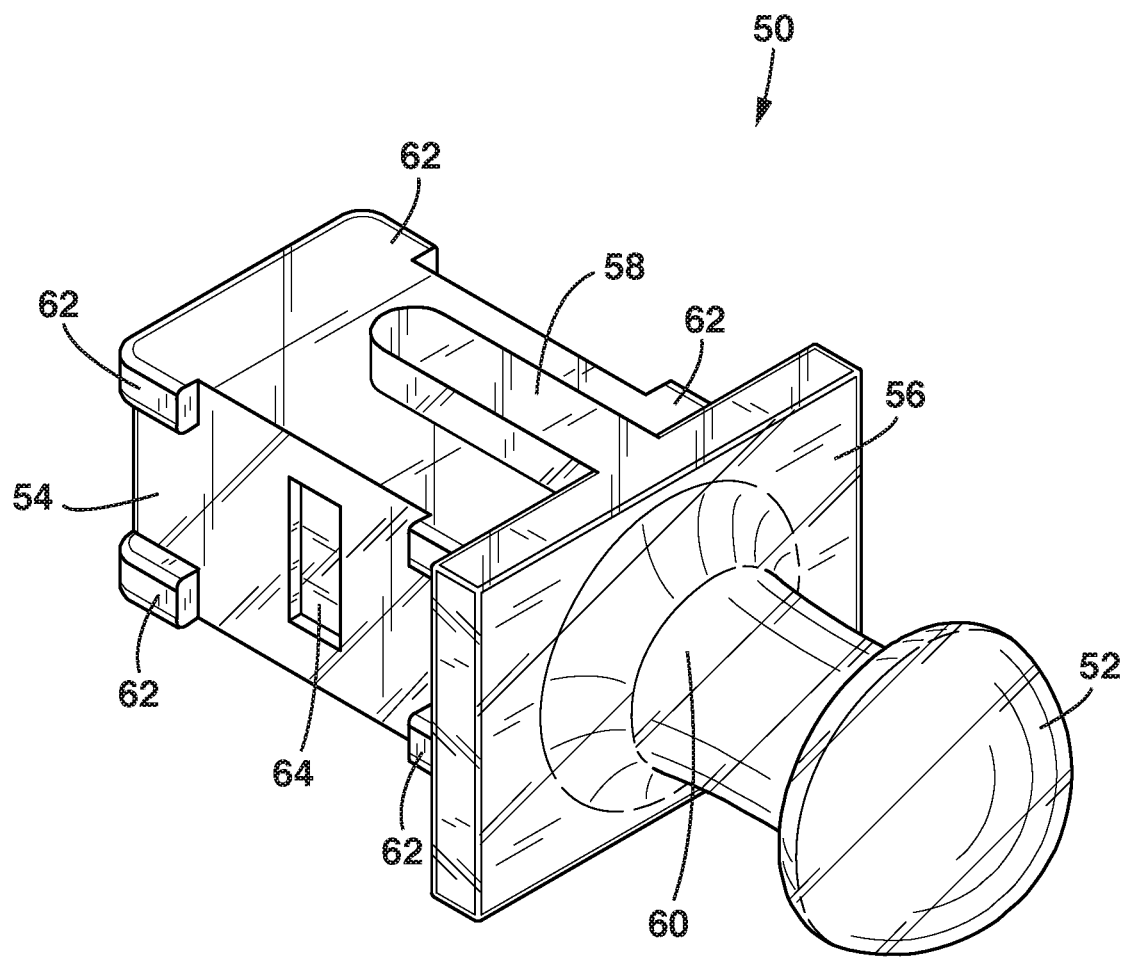
FIG. 19 is a perspective view of one side and the front of the invention according to a third embodiment.
Figure 20:
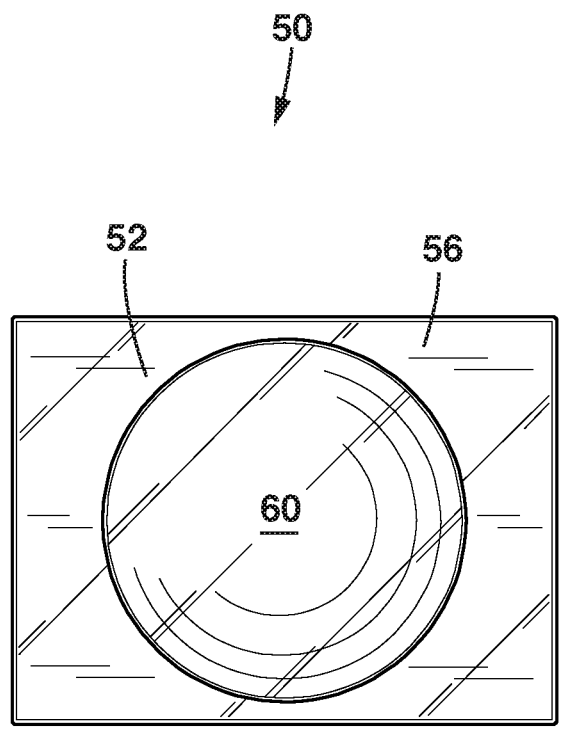
FIG. 20 is a front elevation view thereof.
Figure 21:
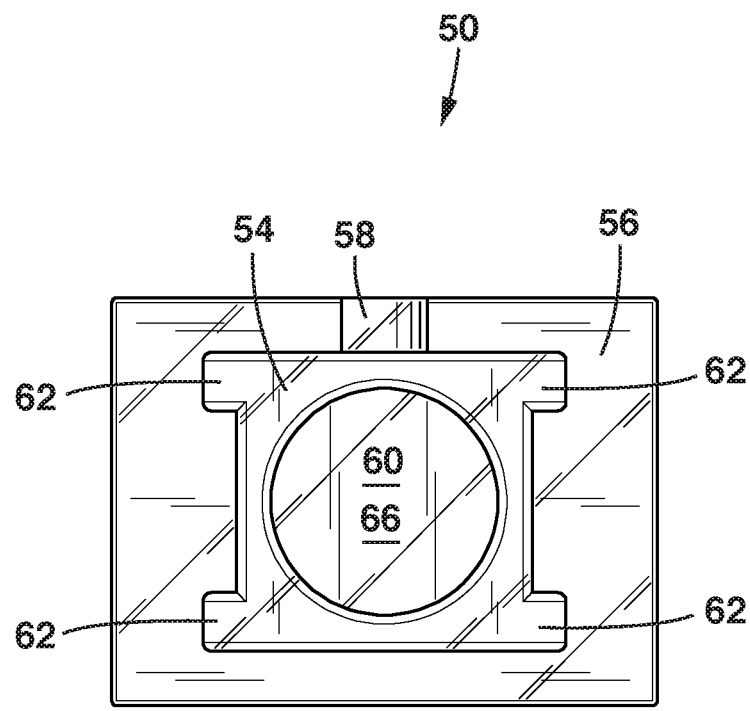
FIG. 21 is a back elevation view thereof.
Figure 22:
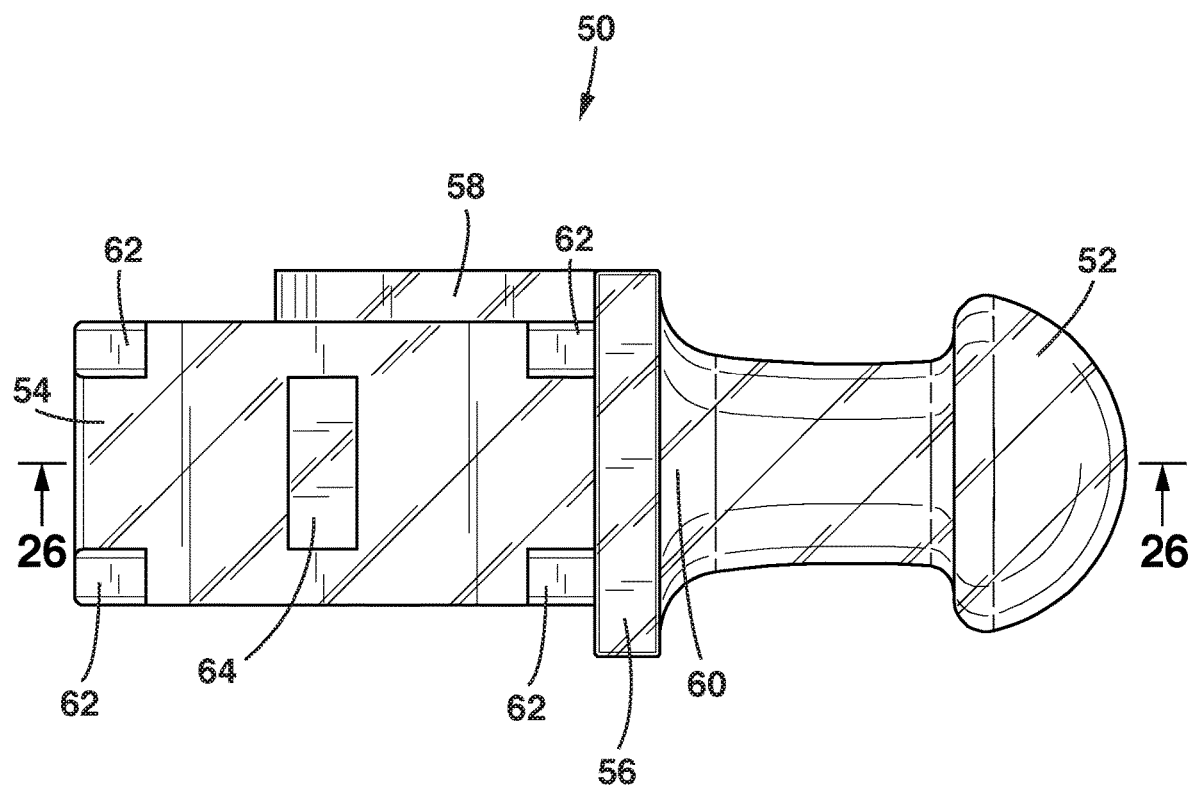
FIG. 22 is a left side elevation view thereof.
Figure 23:
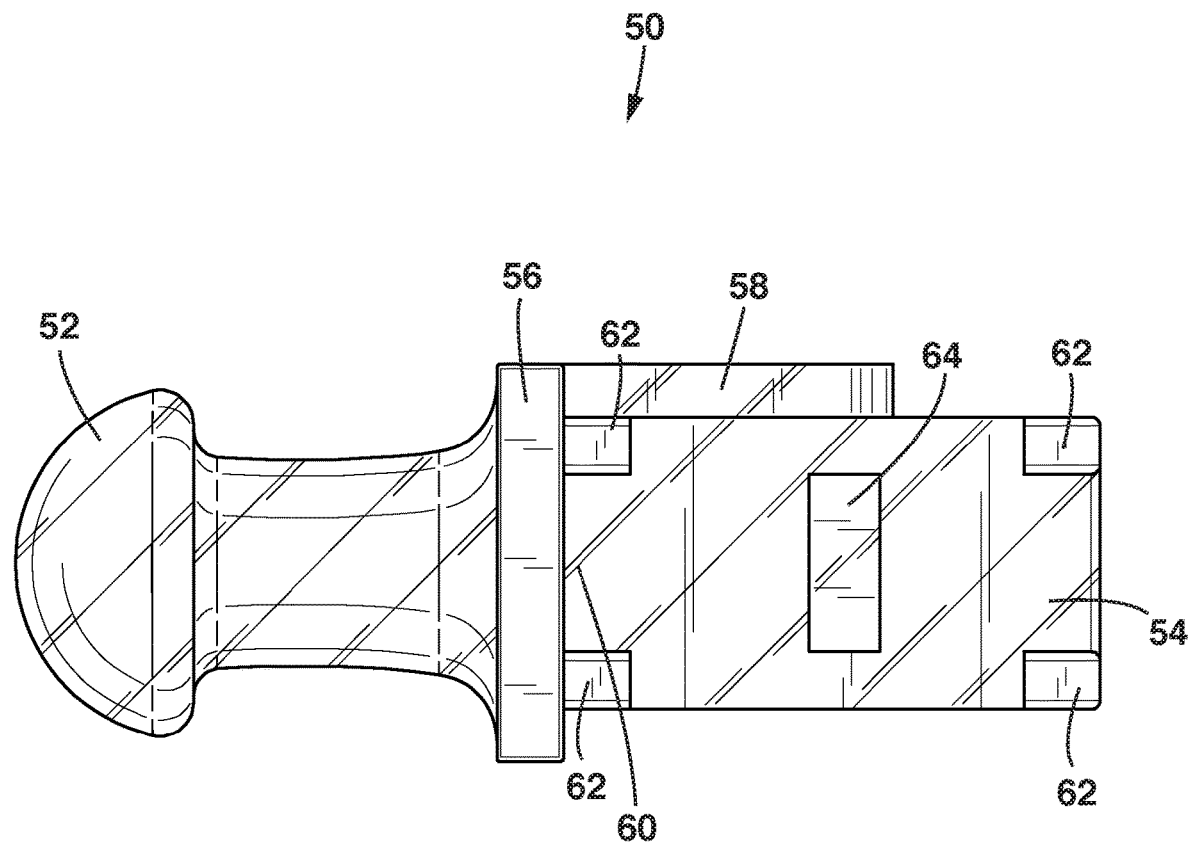
FIG. 23 is a right side elevation view thereof.
Figure 24:
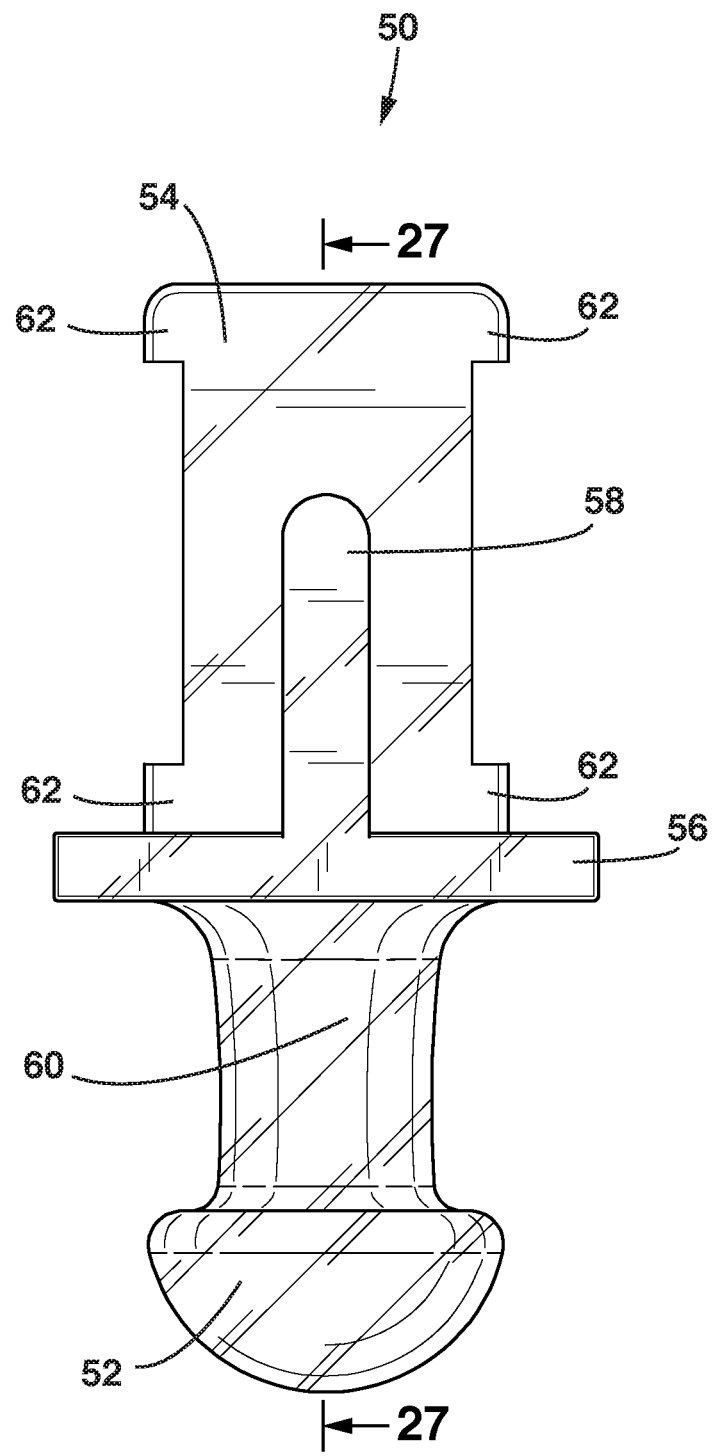
FIG. 24 is a top plan view thereof.
Figure 25:
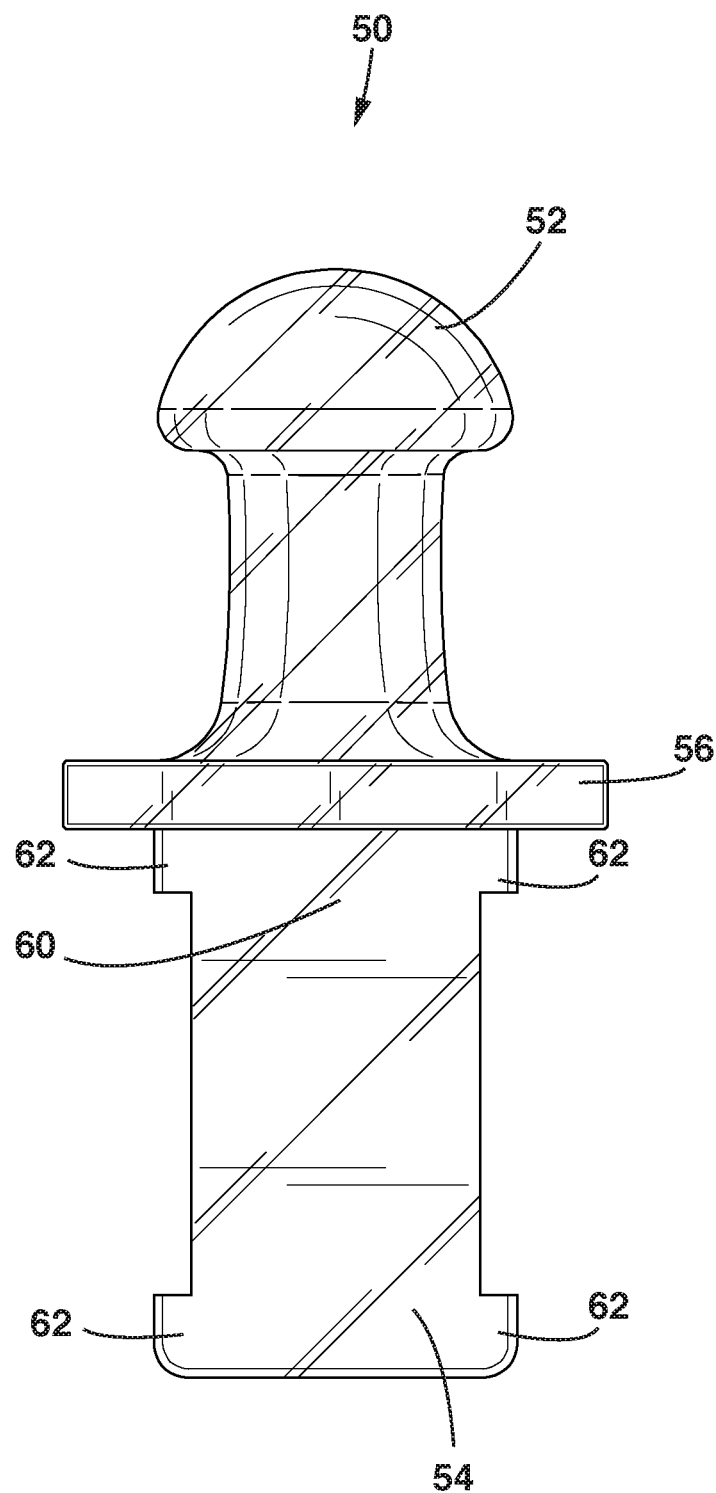
FIG. 25 is a bottom plan view thereof.
Figure 26:
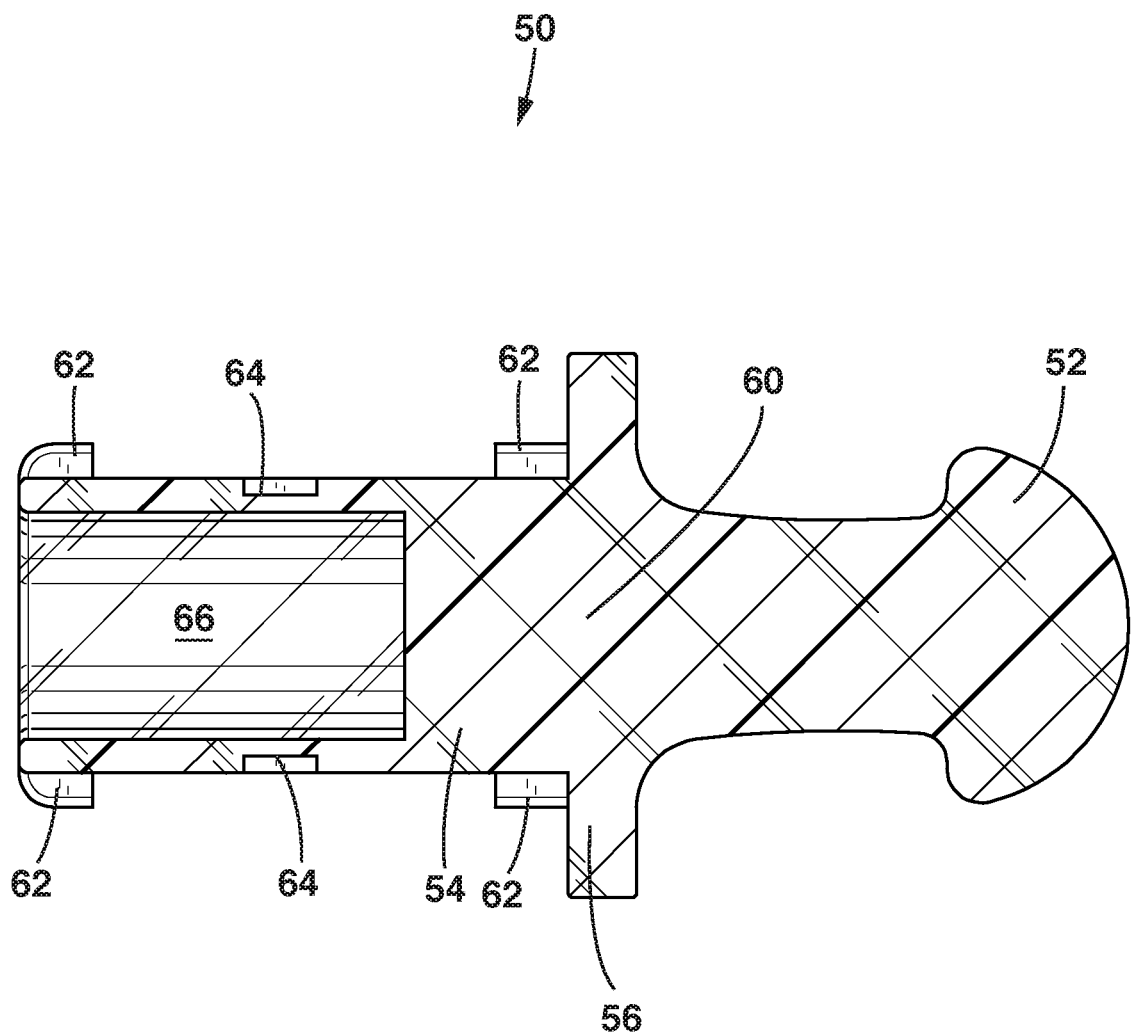
FIG. 26 is a center section view taken from FIG. 22 thereof.
Figure 27:
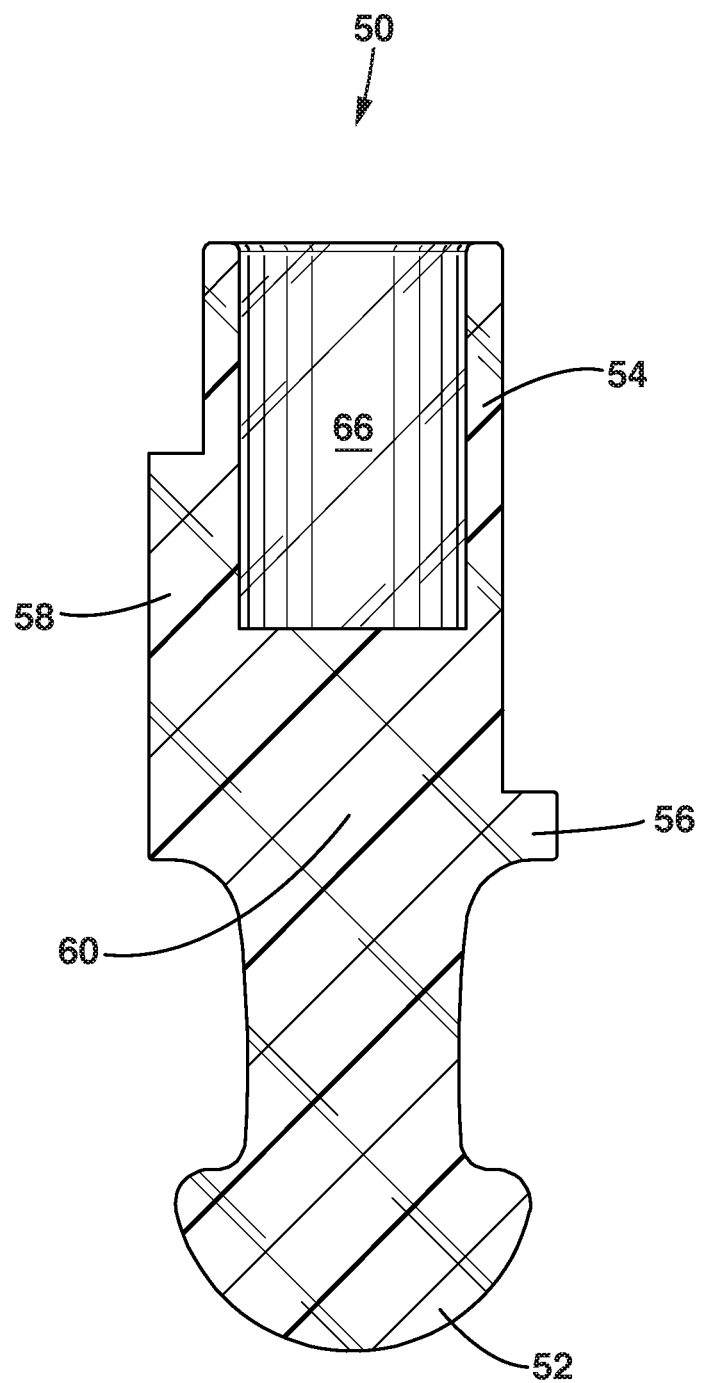
FIG. 27 is a center section view taken from FIG. 24 thereof.
Figure 28:
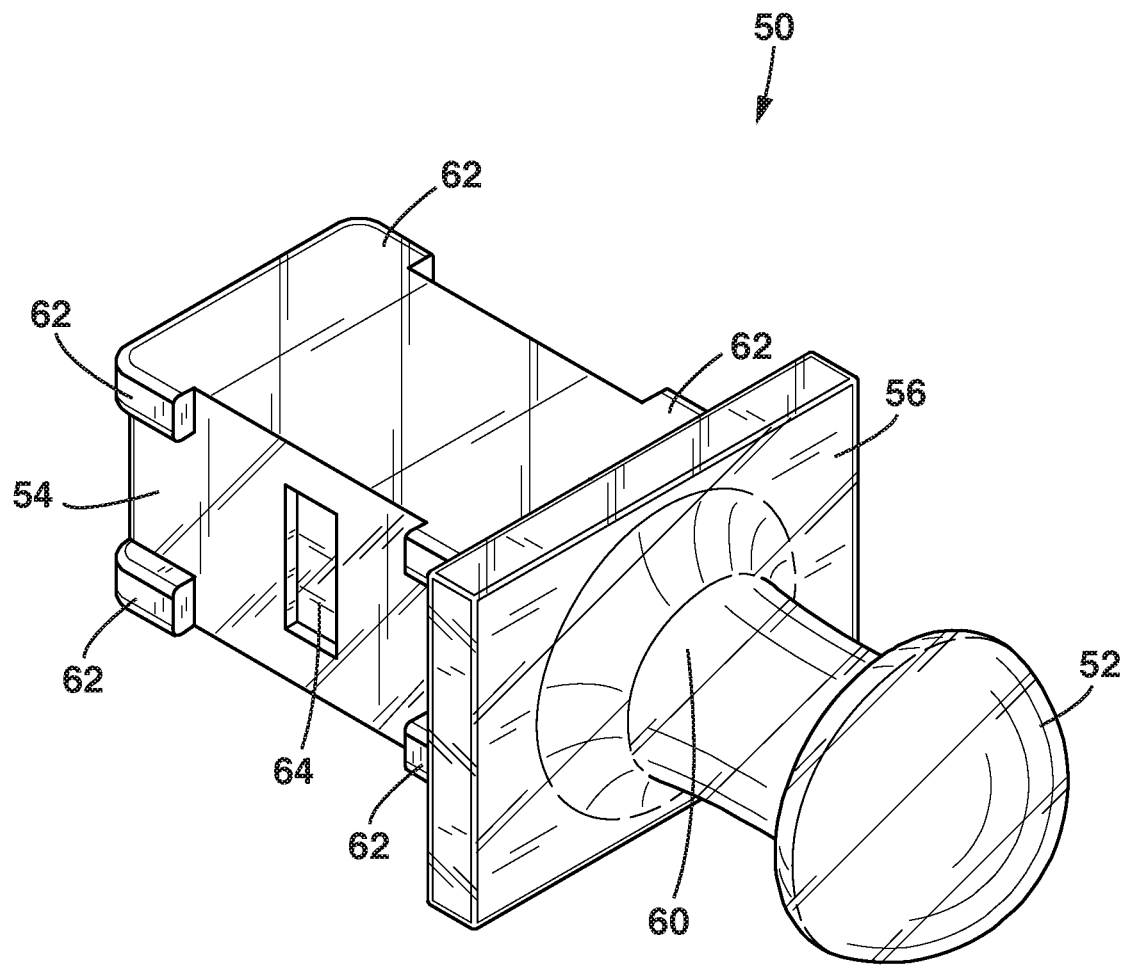
FIG. 28 is a perspective view of one side and the front of the invention according to a forth embodiment.
Figure 29:
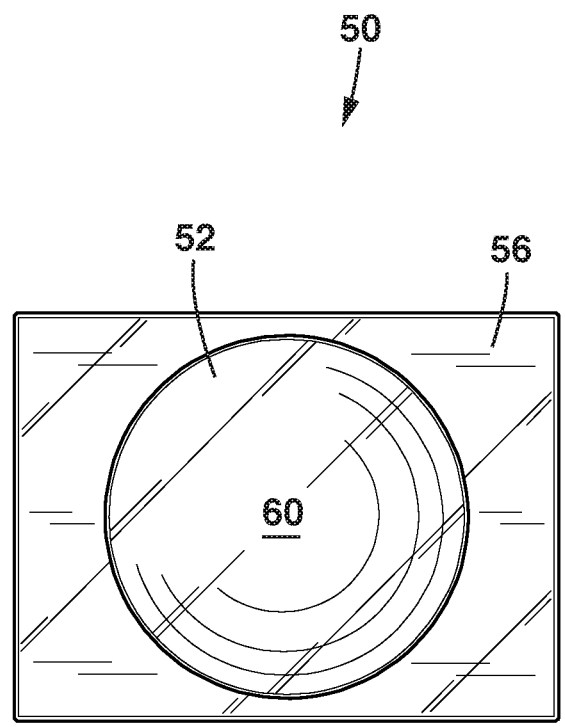
FIG. 29 is a front elevation view thereof.
Figure 30:
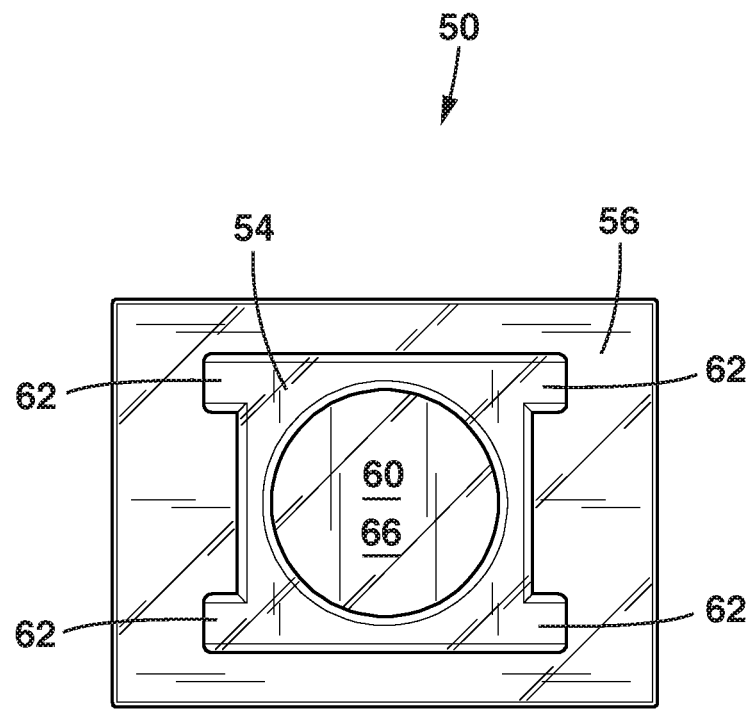
FIG. 30 is a back elevation view thereof.
Figure 31:
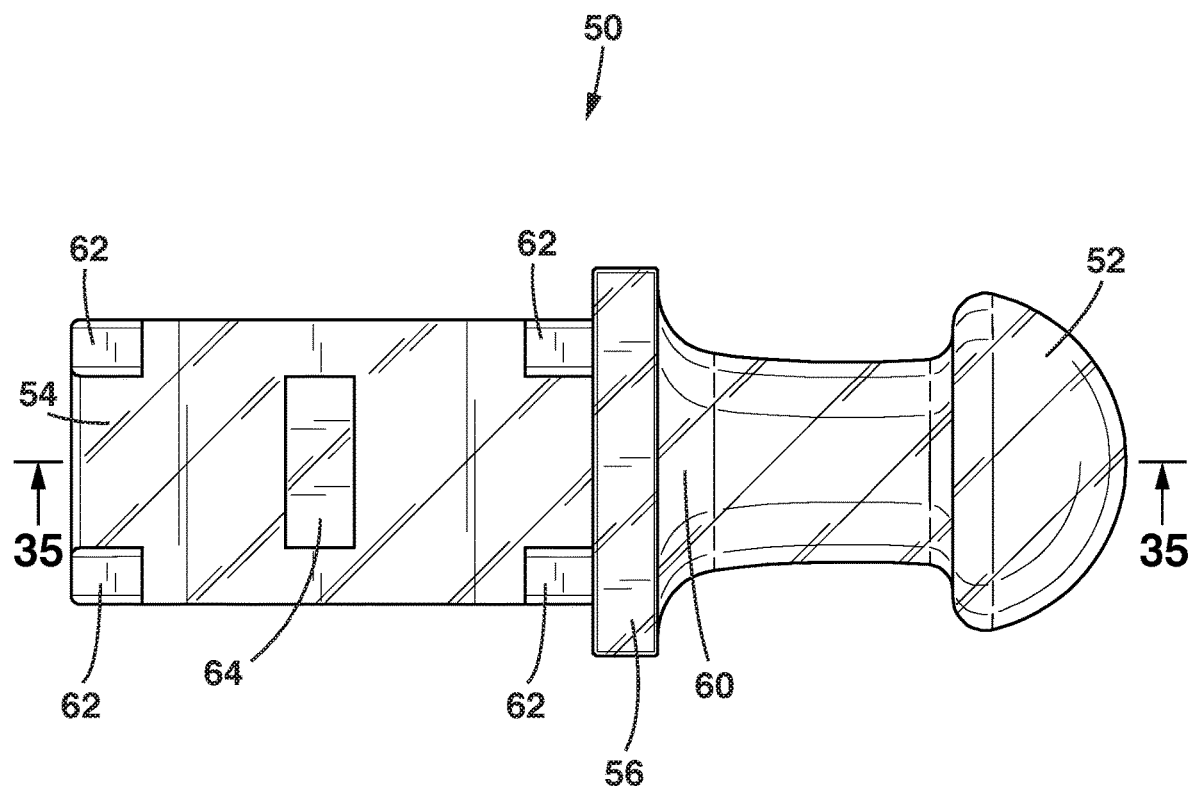
FIG. 31 is a left side elevation view thereof.
Figure 32:
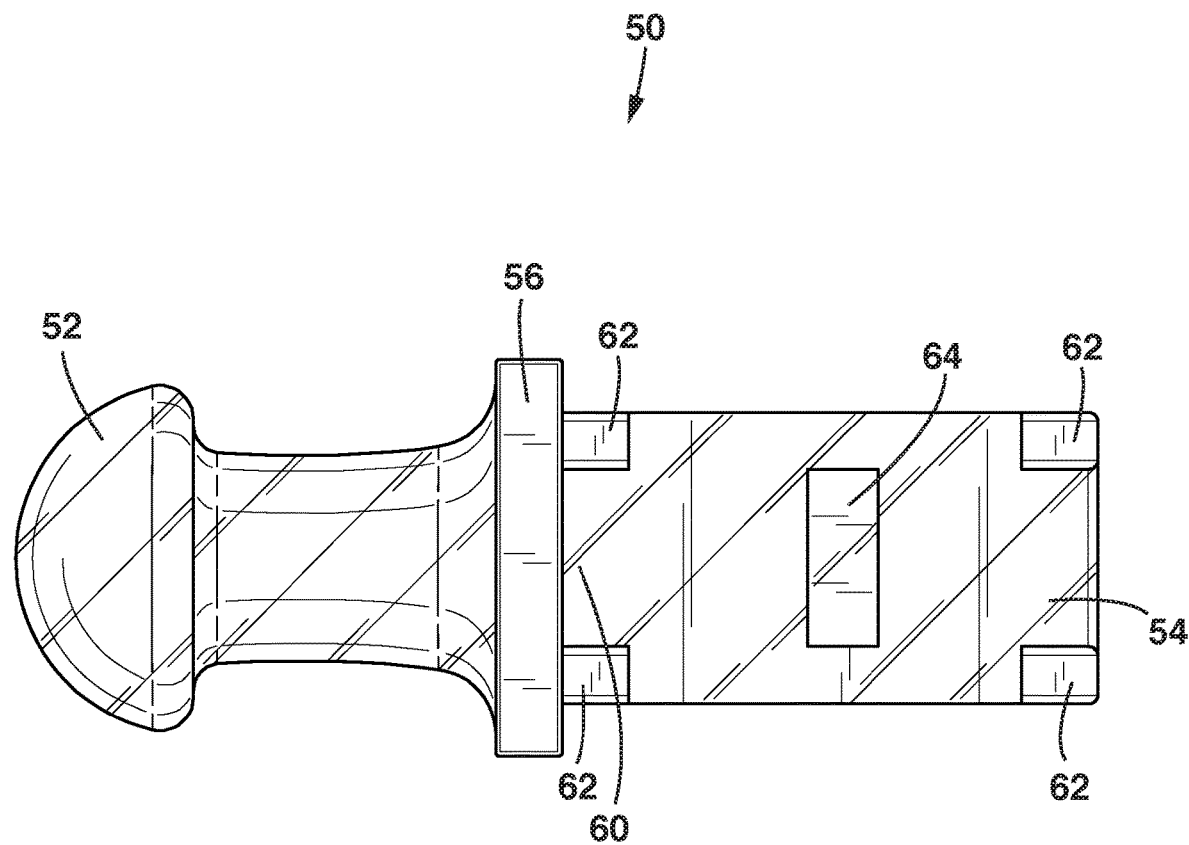
FIG. 32 is a right side elevation view thereof.
Figure 33:
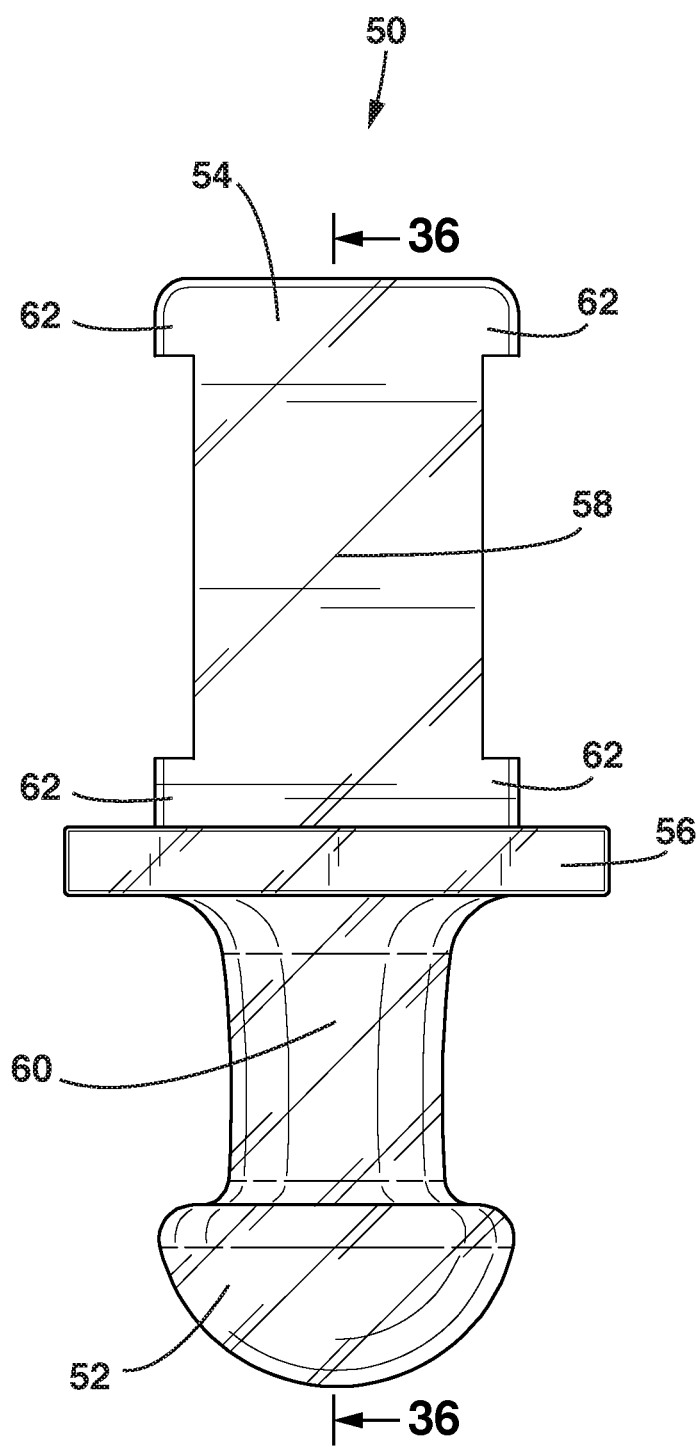
FIG. 33 is a top plan view thereof.
Figure 34:
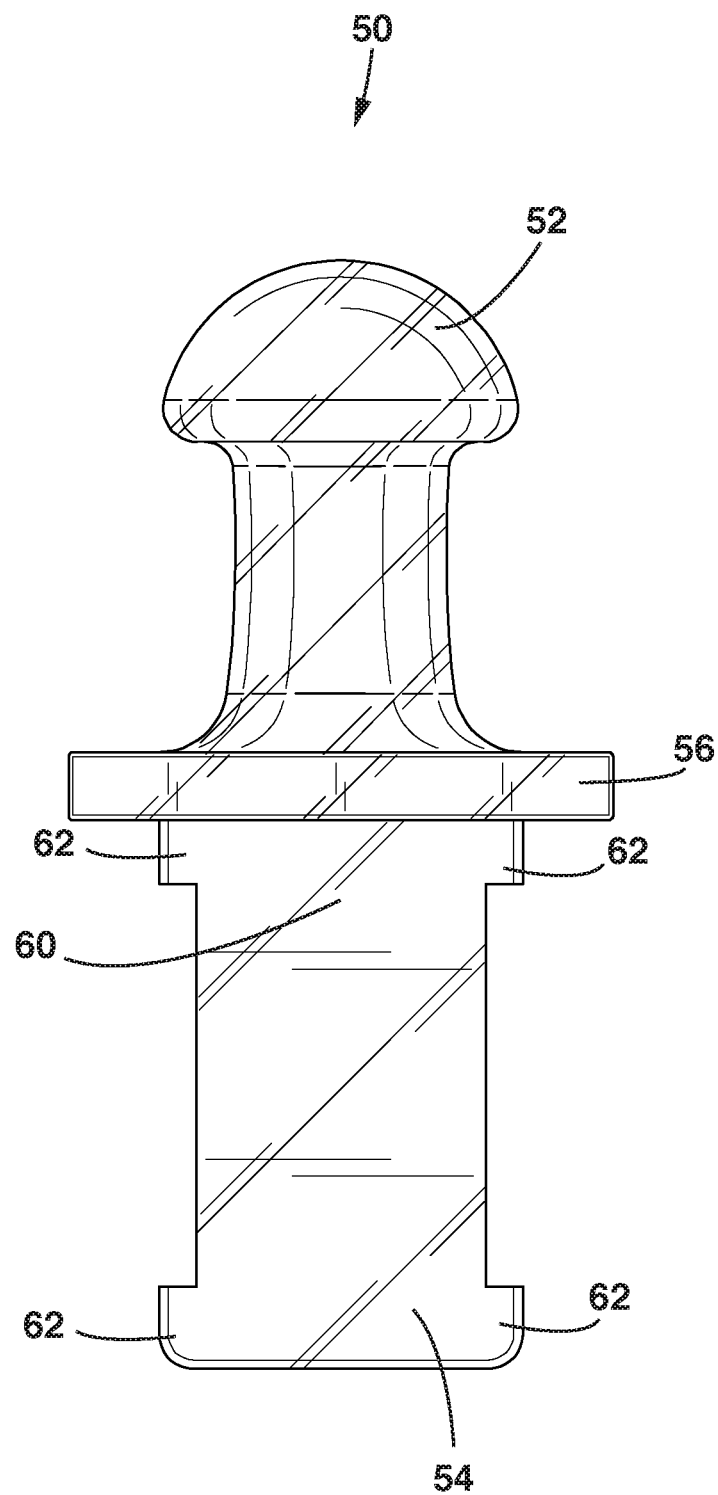
FIG. 34 is a bottom plan view thereof.
Figure 35:
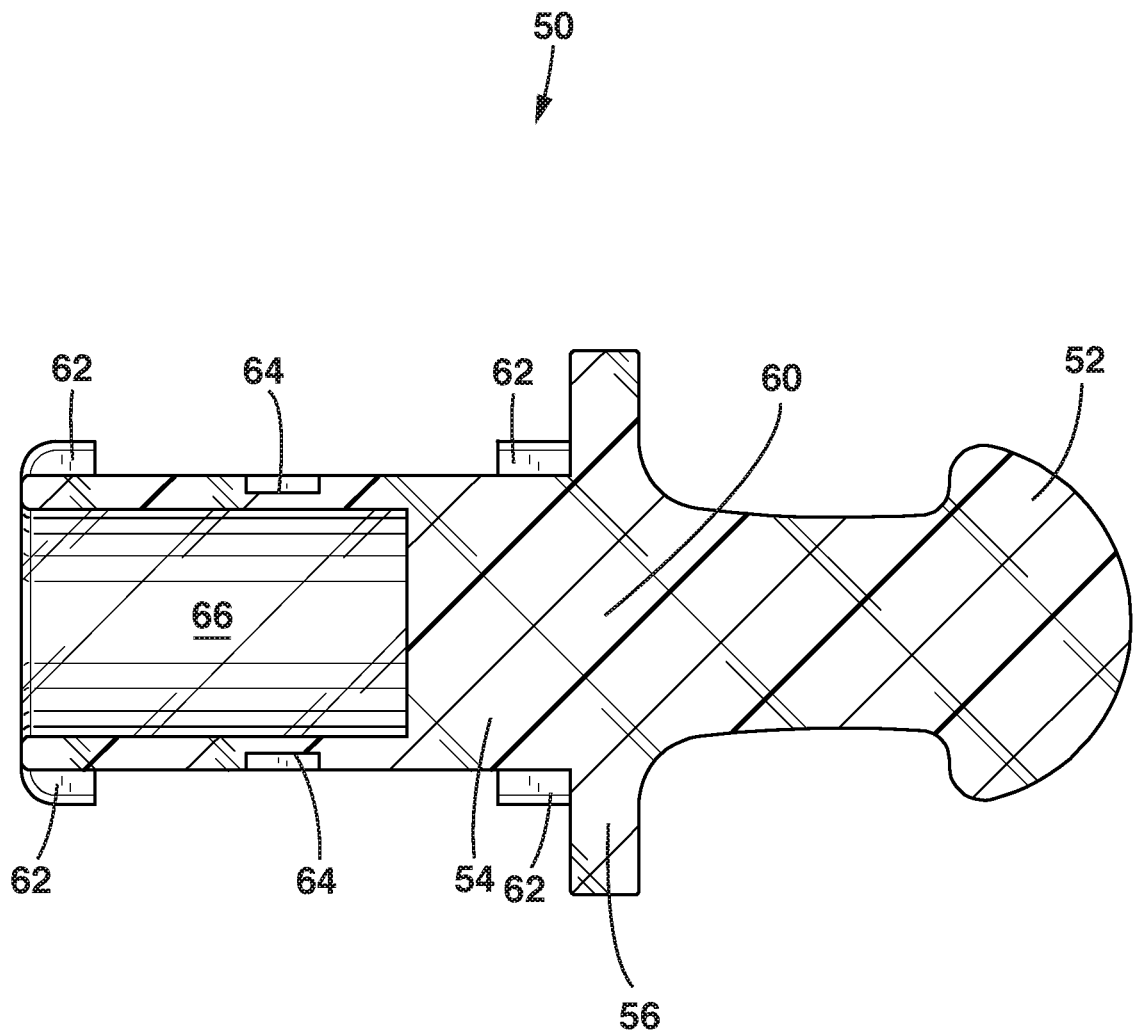
FIG. 35 is a center section view taken from FIG. 31 thereof.
Figure 36:
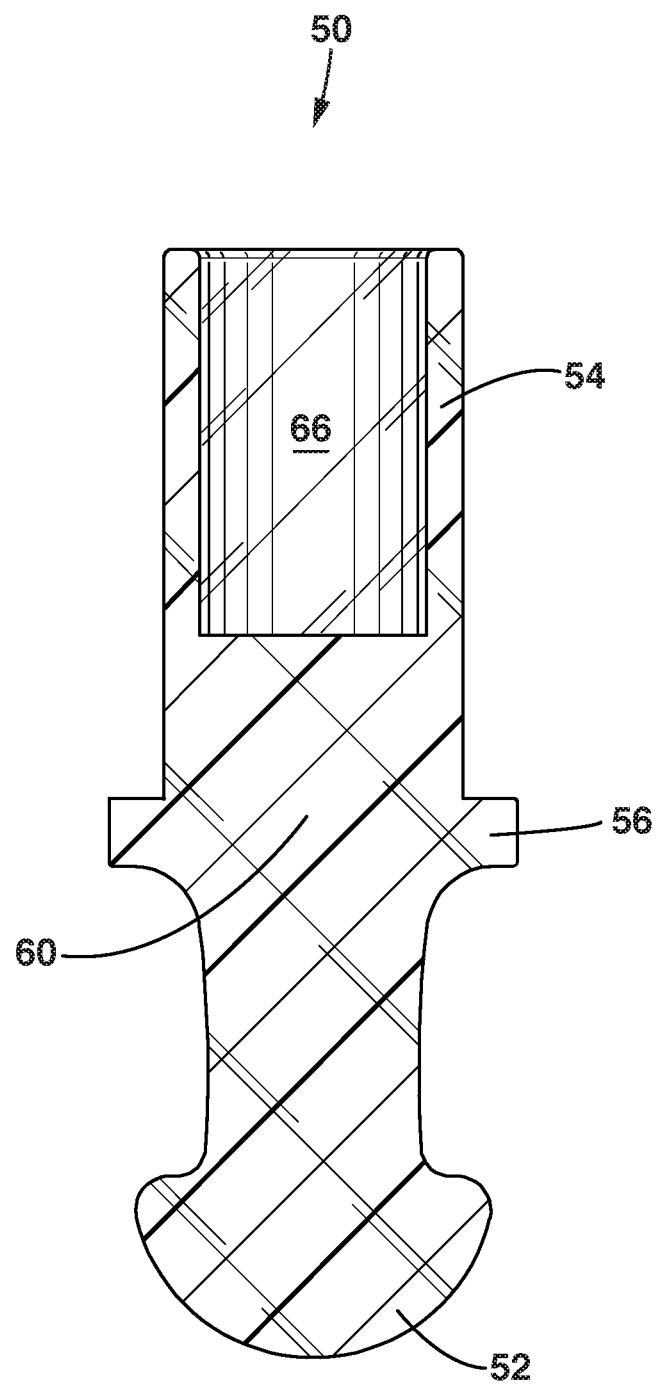
FIG. 36 is a center section view taken from FIG. 33 thereof.
Figure 37:
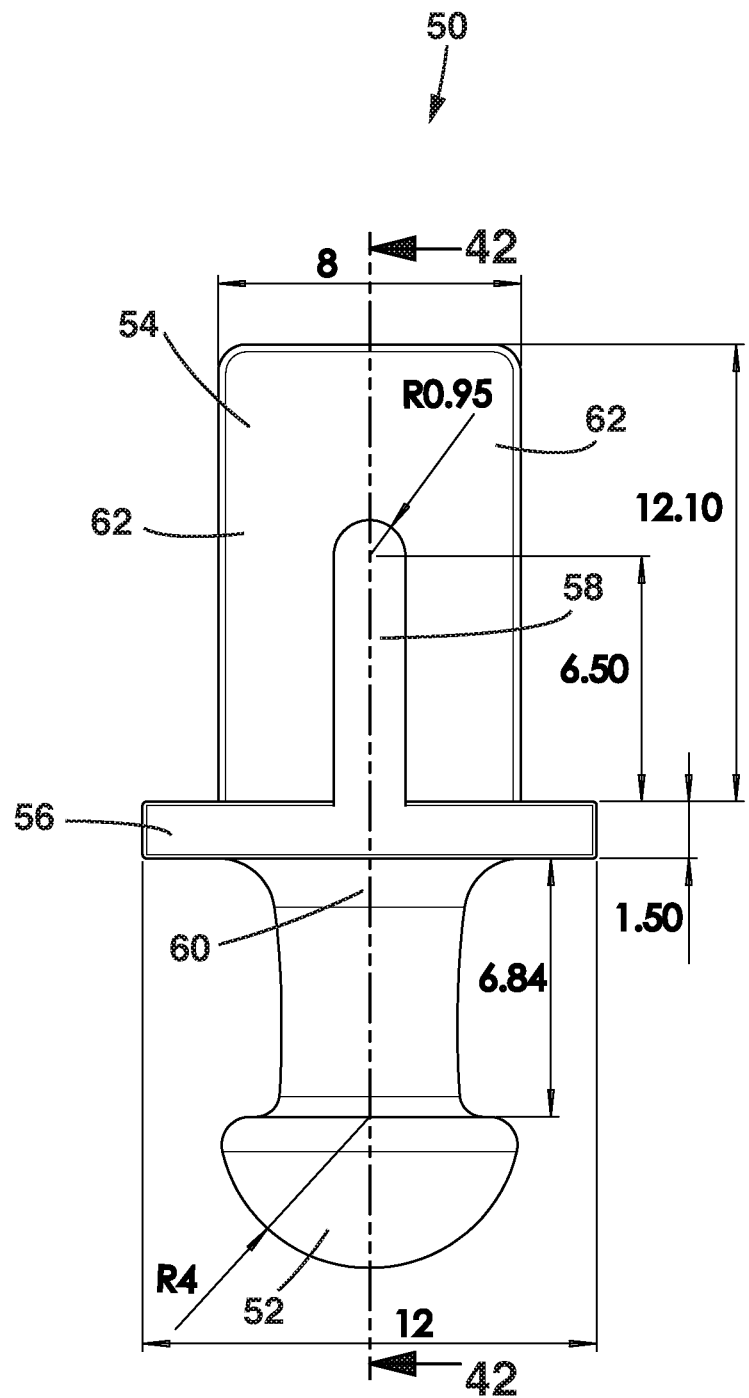
FIG. 37 is a dimensioned top plan view like FIG. 6.
Figure 38:
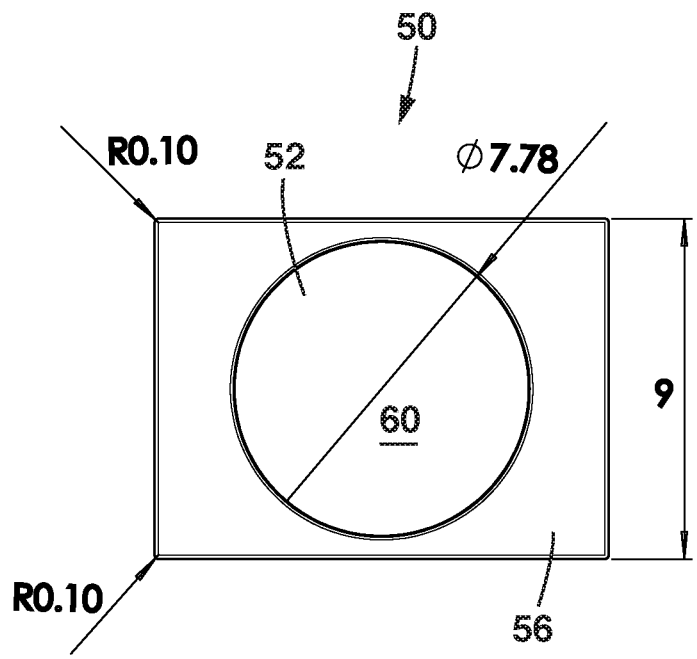
FIG. 38 is a dimensioned front elevation view like FIG. 2.
Figure 39:
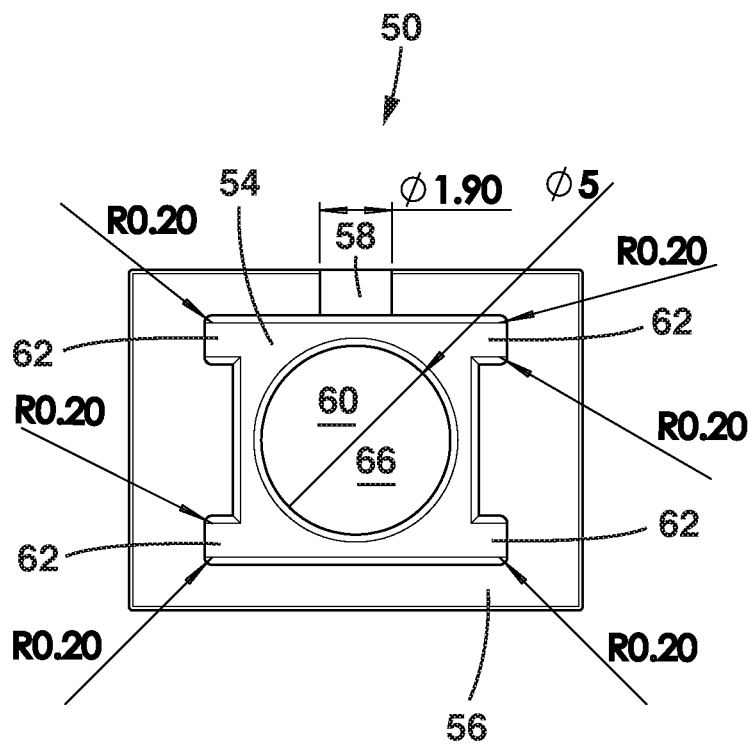
FIG. 39 is a dimensioned back elevation view like FIG. 3.
Figure 40:
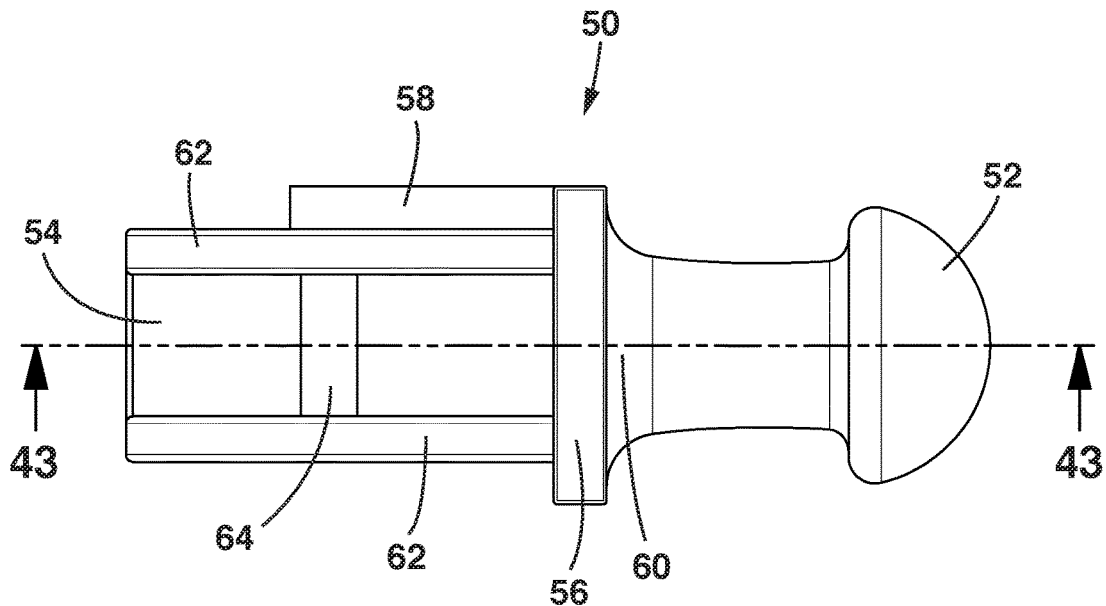
FIG. 40 is a dimensioned left side elevation view like FIG. 4.
Figure 41:
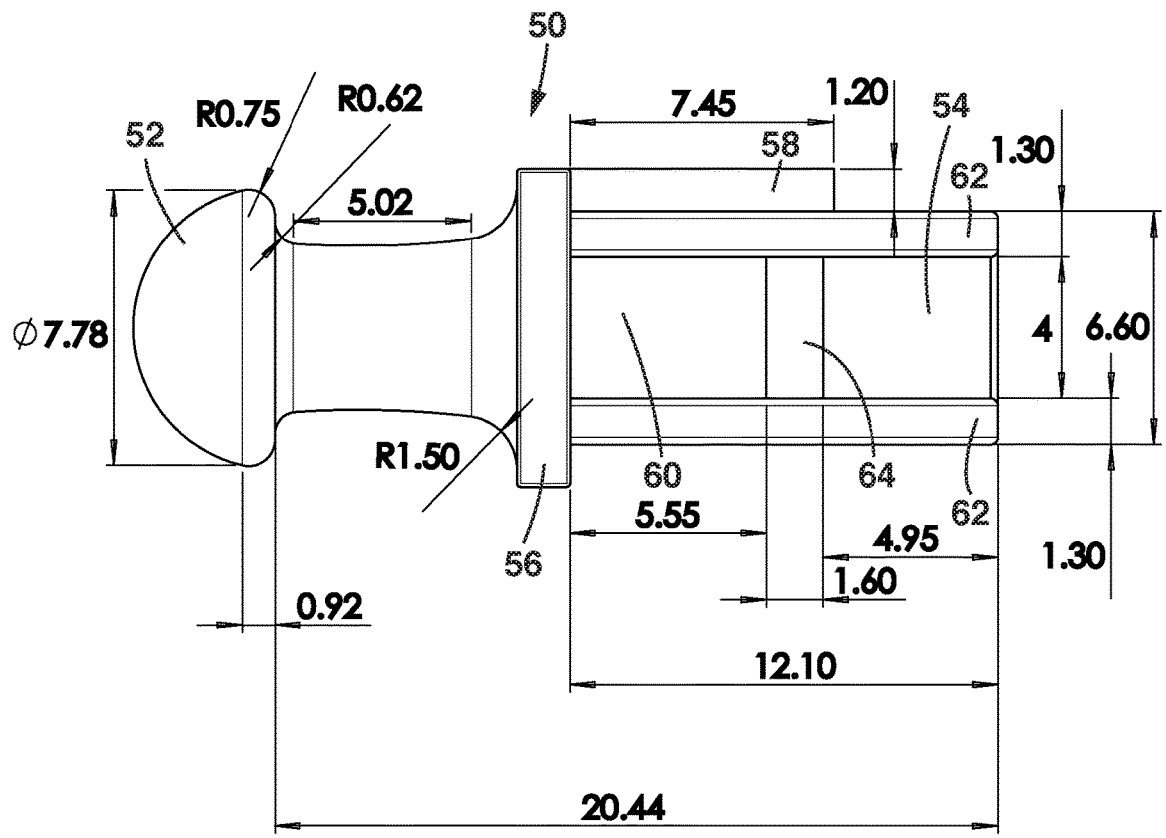
FIG. 41 is a dimensioned right side elevation view like FIG. 5.
Figure 42:
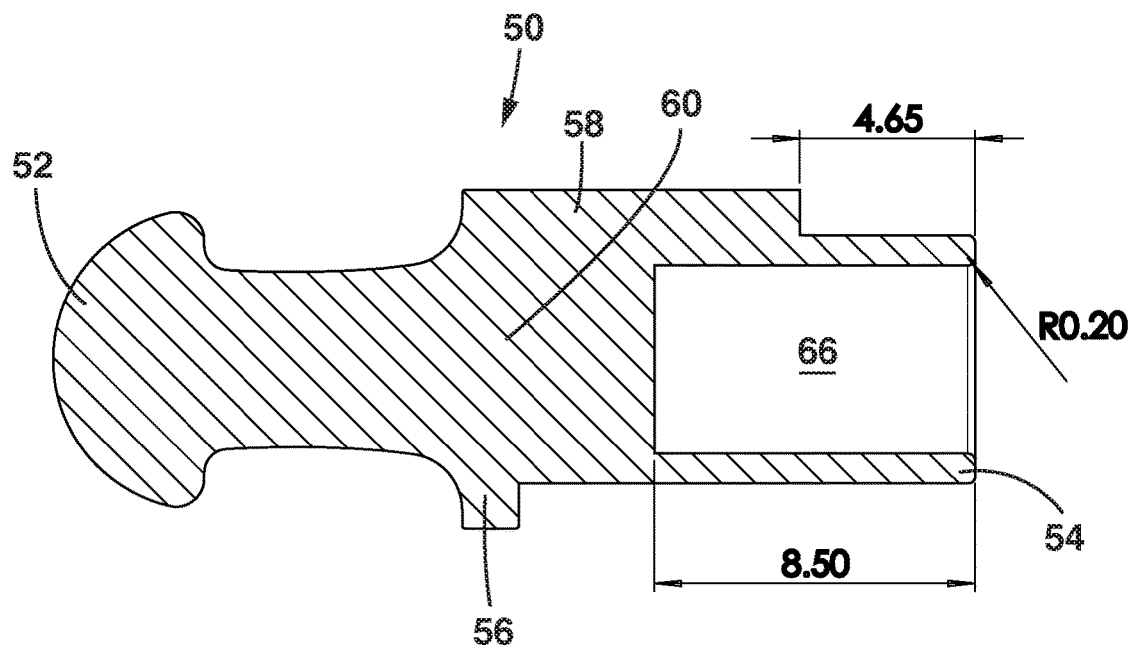
FIG. 42 is a dimensioned center section view taken from FIG. 37.
Figure 43:
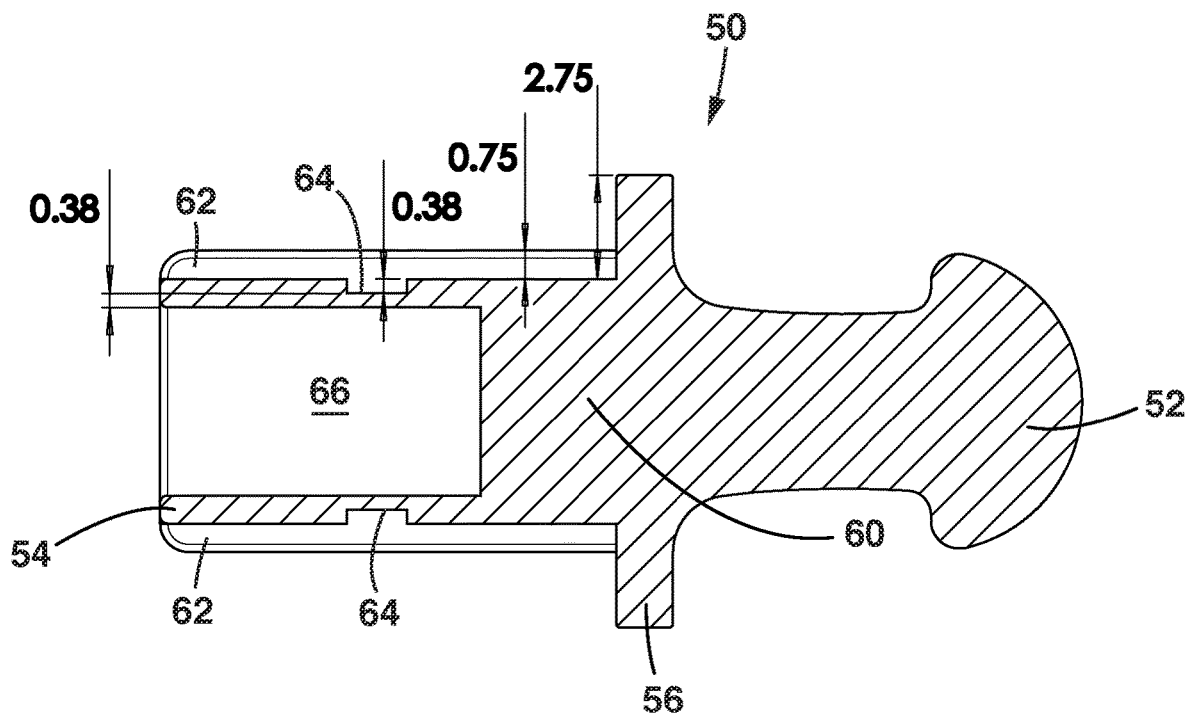
FIG. 43 is a dimensioned center section view taken from FIG. 40.

Referring to FIG. 1 through FIG. 43 a dust and port identification cap for fiber optic adapters generally comprises the elongate dust and port identification cap body 50, the solid mass 60 extends along the central axis of a dust and port identification cap body 50 from the front end of the opening 66 through the front knob 52. The flange 56 has the flange projection 58 and the flange stabilizer 62 that connects the adapter end 54 with the front knob 52 and serves to orient a dust and port identification cap body 50 in the fiber optic adapter. The notch 64 further serves to orient dust and port identification cap body 50 in an adapter and snap fits with a pair of the fiber optic adapter dust cap connectors.

A dust and port identification cap body 50 can be made of any type of material or in at least one embodiment thermoplastic elastomer or thermoplastic material. Such polymers are easily injection molded. Suitable plastic polymers can comprise, for example, polyethylene (low-density, high density, or low linear), polypropylene, polycarbonate, polystyrene, polyvinyl chloride, polyesters such as polyethylene terephthalate, or any of a variety of combinations.

In various embodiments, a dust and port identification cap body 50 can be made of varying colors, densities, translucent material, opaque material and various combinations of translucent and opaque material combined together, according to the desired application, and to enhance the brilliance of the visible laser light coming through a dust and port identification cap body 50. Accordingly a dust and port identification cap body 50 can be molded of opaque material and or translucent material, in particular in at least one embodiment translucent material of the primary and tertiary spectral colors red, orange, yellow, green, blue and violet also known as monochromatic light colors of the following wavelength and frequency.

| color | wavelength | frequency |
| --- | --- | --- |
| red | 620 750 nm | 400-484 THz |
| orange | 590-620 nm | 484-508 THz |
| yellow | 570-590 nm | 508-526 THz |
| green | 495-570 nm | 526-606 THz |
| blue | 450-495 nm | 606-668 THz |
| violet | 380-450 nm | 668-789 THz |

The spectral colors actually comprise a spectrum of continuous color with no clear boundaries between one color and the next, between the wavelengths 380 and 750 nm and frequencies of 668 and 484 THz and can be used to form part of or a whole dust and port identification cap body 50.

In telecommunications and other technology fields there are of course lasers with wavelengths in the infrared, masers that emit coherent microwaves and even x-ray lasers. In another embodiment a dust and port identification cap body 50 can be made of a material that makes these lasers visible as their light passes through a dust and port identification cap body 50.

B. Front Knob

Referring, in particular, to FIG. 1 through FIG. 43. A front knob 52 is preferably comprised of a cylindrical solid shaft measuring about 5 mm wide by about 6.84 mm long that has an outwardly flared back end that inter connects with the front side of flange 56 and an outwardly flared front end that inter connects with a back side of a hemisphere like solid measuring about 4 mm radius or about 7.78 mm in diameter by about 4 mm in depth. The purpose of a front knob 52 is to serve as a means for a technician to grip a dust and port identification cap body 50 and insert it into a fiber optic adapter. A solid mass 60 comprises a part of front knob 52.

C. Adapter End

Referring, in particular, to FIG. 1 through FIG. 43. An adapter end 54 is preferably comprised of at least solid mass 60, notch 64 and opening 66. An adapter end 54 is inter connected to the back side of flange 56 and is capable of being fully inserted into a fiber optic adapter. The purpose of an adapter end 54 is to act as a preventative to dust contamination in a fiber optic system and serve as a laser light entering end and conduit transmitting laser light through the rest of a dust and port identification cap body 50.

D. Flange

Referring, in particular, to FIG. 1 through FIG. 43. A flange 56 is preferably comprised of a rectangular solid measuring about 9 mm wide by about 12 mm long by about 1.5 mm in depth. A solid mass 60 comprises the central part of flange 56. The purpose of a flange 56 is to inter connect the back end of front knob 52 with the front end of adapter end 54 and the front end of flange projection 58. A flange 56 serves to close off the front end of a fiber optic adapter when it is inserted into a fiber optic adapter.

E. Flange Projection

Referring, in particular, to FIG. 1, FIG. 3 through FIG. 6, FIG. 9, FIG. 19, FIG. 21 through FIG. 24, FIG. 27, FIG. 37 and FIG. 39 through FIG. 42. A flange projection 58 is preferably comprised of a rectangular solid measuring about 1.9 mm wide by about 7.45 mm long by about 1.2 mm in depth. Flange projection 58 inter connects with the top of adapter end 54 at the bottom of flange projection 58 and inter connects with flange 56 at its front end. Flange projection 58 has about a 0.95 mm radius at its back end. The purpose of a flange projection 58 is to serve as an alignment and stabilizing means to engage a slot located on the top of a fiber optic adapter. A flange projection 58 may or may not be present in the composition of a dust and port identification cap body 50. As is shown as an example in FIG. 10 through FIG. 18.

F. Solid Mass

Referring, in particular, to FIG. 1 through FIG. 43. A solid mass 60 extends along the central axis of a dust and port identification cap body 50 from the front end of the opening 66 through the front knob 52 and is preferably comprised of a solid core of material measuring by about 5 mm wide by about 5 mm long by about 16 mm in depth from the front end of front knob 52 to the front end of opening 66. The purpose of a solid mass 60 is to provide a core of material to maximize the transmission of laser light from the opening 66 through and from the front knob 52.

G. Flange Stabilizer

Referring, in particular, to FIG. 1 through FIG. 43. A flange stabilizer 62 is preferably comprised of a rectangular solid measuring about 0.75 mm wide by about 12.10 mm long by about 1.30 mm in depth. At least two or more flange stabilizers 62 are present in a dust and port identification cap body 50. Flange stabilizers 62 are located in any position on the left and right sides of adapter end 54 not obstructing notch 64 and project from those sides. In the flange stabilizer 62 embodiment shown in FIG. 28 through FIG. 36 the length of the rectangular solid can be about 2 mm or less. Material is removed in this embodiment for efficiency in manufacturing. The purpose of a flange stabilizer 62 is to correctly align and fix a dust and port identification cap body 50 when it is inserted into a fiber optic adapter.

H. Notch

Referring, in particular, to FIG. 1, FIG. 4, FIG. 5, FIG. 8, FIG. 10, FIG. 13, FIG. 14, FIG. 17, FIG. 19, FIG. 22, FIG. 23, FIG. 26, FIG. 28, FIG. 31, FIG. 32, FIG. 35, FIG. 40, FIG. 41 and FIG. 43. A notch 64 is preferably comprised of an open void measuring about 1.6 mm wide by about 4 mm long by about 0.38 mm in depth and is contained within an adapter end 54 of a dust and port identification cap body 50. Notch 64 is further comprised of about ninety degree angles and is located in a vertical fashion about 5.55 mm from the back of flange 56 and about 4.95 mm from the back of adapter end 54. The purpose of a pair of notches 64 is to snap fit connect a dust and port identification cap body 50 with a pair of fiber optic adapter dust cap connectors positioned within a fiber optic adaptor.

I. Opening

Referring, in particular, to FIG. 3, FIG. 8, FIG. 9, FIG. 12, FIG. 17, FIG. 18, FIG. 21, FIG. 26, FIG. 27, FIG. 30, FIG. 35, FIG. 36, FIG. 39, FIG. 42 and FIG. 43. An opening 66 is preferably comprised of a cylindrical void measuring about 5 mm in diameter by about 8.5 mm in length and is contained within an adapter end 54 of a dust and port identification cap body 50 who's purpose is to fit over a fiber optic adapter ferrule contained within a fiber optic adaptor.

In one embodiment an opening 66 is provided that accommodates an air gap of about at least 3 mm from the end of the fiber optic adapter ferrule and the front end of opening 66 no matter what the over all length of the opening 66 is.

The dimensions, preferably described above for components A through J, could vary within a range as much as twenty percent plus or minus in other embodiments.

J. In Use

A technician wishing to identify a particular length of fiber optic cable or particular optical fiber port along a run of fiber where a dust and port identification cap for fiber optic adapters is installed uses a VFL to emit a bright beam of laser light into the terminus of the first cable. By operation of the interconnectivity of the first cable with connected cables throughout any number of multiple crossings, light is transmitted throughout the first cable and any subsequently connected cable. The transmitted light is reflected out of the cable attached to the optical fiber adapter with a dust and port identification cap body 50 installed and diffused through the air gap created by opening 66. The diffused light is received by adapter end 54 and transmits through solid mass 60 illuminating dust and port identification cap body 50 inclusive of flange 56 and front knob 52 in a safe, yet piercingly bright manner. The two technicians can then clearly and appropriately identify which fiber optic cables are connected to which other cables, and at which ports, without removing individual dust caps.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A dust and port identification cap for fiber optic adapters, comprising:

an opaque or translucent elongate body having a first end and a second end opposite the first end, and at least two sides extending at least partially between the first end and the second end;

the elongate body comprising a fixed flange disposed between the first and second ends of the body, the flange having first and second flange surfaces extending laterally outward from at least the two sides, wherein the first flange surface is on the flange opposite the second flange surface;

a knob portion at the first end extending outward from the first flange surface, the knob portion including a bulbous structure at the first end and a neck extending between the first flange surface and the bulbous structure, and wherein the neck has a perimeter dimensionally smaller than a perimeter of the bulbous structure;

an adaptor portion at the second end extending outward from the second flange surface in a direction opposite the knob portion, wherein the adaptor portion has an opening for receiving a fiber optic cable therein that continues inward from the second end toward the first end and that terminates at an inner surface between the second end and the second flange surface, the elongate body having a continually solid central core between the inner surface and a point on the knob at the first end farthest from the inner surface.

2. The dust and port identification cap for fiber optic adaptors of claim 1, wherein the elongate body is made of a material having a red color.

3. The dust and port identification cap for fiber optic adaptors of claim 1, wherein the elongate body is made of a material having an orange color.

4. The dust and port identification cap for fiber optic adaptors of claim 1, wherein the elongate body is made of a material having a yellow color.

5. The dust and port identification cap for fiber optic adaptors of claim 1, wherein the elongate body is made of a material having a green color.

6. The dust and port identification cap for fiber optic adaptors of claim 1, wherein the elongate body is made of a material having a blue color.

7. The dust and port identification cap for fiber optic adaptors of claim 1, wherein the elongate body is made of a material having a violet color.

8. The dust and port identification cap for fiber optic adaptors of claim 1, wherein the elongate body has a cylindrical opening therein extending into the adaptor portion for receiving a fiber optic cable.

9. The dust and port identification cap for fiber optic adaptors of claim 1, wherein the elongate body is entirely solid, without voids therein between the first flange surface and the first end.

10. The dust and port identification cap for fiber optic adaptors of claim 1, wherein the elongate body is entirely solid, without voids therein between the second flange surface and the first end.

11. The dust and port identification cap for fiber optic adaptors of claim 1, wherein the elongate body is entirely solid, without voids therein between the inner surface and the first end.

12. The dust and port identification cap for fiber optic adaptors of claim 1, wherein the knob has a hemispherical end having a radius of 4 mm to 7.78 mm.

13. The dust and port identification cap for fiber optic adaptors of claim 1, wherein the opening forms a cylindrical void having a diameter of 5 mm to 8.5 mm.

14. The dust and port identification cap for fiber optic adaptors of claim 1, wherein the elongate body is entirely solid, without voids therein between the second flange surface and the first end.

15. The dust and port identification cap for fiber optic adaptors of claim 14, wherein the adaptor portion is further configured to maintain an air gap between an end of a fiber optic adapter ferrule and the opening at the second end.

16. A dust and port identification cap for fiber optic adapters, comprising:

an opaque or translucent elongate body having a first end and a second end opposite the first end;

the elongate body comprising a flange disposed between the first and second ends of the body, wherein the flange is substantially rectangular and is positioned in a flange plane which is substantially perpendicular to a main axis of the elongate body;

a knob portion at the first end extending outward from the flange, the knob portion including a bulbous structure at the first end and a neck extending between the first flange surface and the bulbous structure, and wherein the neck has a perimeter dimensionally smaller than a perimeter of the bulbous structure;

an adaptor portion at the second end extending outward from the flange in a direction opposite the knob portion, wherein the adaptor portion further comprises at least one stabilizer extending from a sidewall of the adaptor portion and wherein the adaptor portion has an opening for receiving a fiber optic cable therein that continues inward from the second end toward the first end and that terminates at an inner surface between the second end and the second flange surface, the elongate body having a continually solid central core between the inner surface and a point on the knob at the first end farthest from the inner surface.

17. The dust and port identification cap for fiber optic adaptors of claim 16, wherein the elongate body is formed of a thermoplastic elastomer or a thermoplastic material, and further wherein the thermoplastic elastomer or the thermoplastic material is configured to receive visible laser light and emit light within a predetermined range of wavelengths/frequencies different than that of the visible laser light received.

18. The dust and port identification cap for fiber optic adaptors of claim 17, wherein the predetermined range of wavelengths/frequencies of the emitted light is selected from:

620-750 nm/400-484 THz;

590-620 nm/484-508 THz;

570-590 nm/508-526 THz;

495-570 nm/526-606 THz;

450-495 nm/606-668 THz; and 380-450 nm/668-789 THz.

\* \* \* \* \*